(12) United States Patent
Harada et al.

(10) Patent No.: US 12,720,517 B2
(45) Date of Patent: Aug. 25, 2026

(54) TERMINAL, RADIO COMMUNICATION METHOD, AND BASE STATION

(71) Applicant: NTT DOCOMO, INC., Tokyo (JP)

(72) Inventors: Hiroki Harada, Tokyo (JP); Shinya Kumagai, Tokyo (JP); Satoshi Nagata, Tokyo (JP); Jing Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 320 days.

(21) Appl. No.: 18/565,845

(22) PCT Filed: Jun. 3, 2021

(86) PCT No.: PCT/JP2021/021257
§ 371 (c)(1),
(2) Date: Nov. 30, 2023

(87) PCT Pub. No.: WO2022/254674
PCT Pub. Date: Dec. 8, 2022

(65) Prior Publication Data

US 2024/0267902 A1 Aug. 8, 2024

(51) Int. Cl.
*H04W 76/20* (2018.01)
*H04L 5/14* (2006.01)
(Continued)

(52) U.S. Cl.
CPC ....... *H04W 72/0457* (2023.01); *H04L 5/1469* (2013.01); *H04W 72/231* (2023.01); *H04W 76/20* (2018.02)

(58) Field of Classification Search
CPC .. H04L 5/001; H04L 5/1469; H04W 72/0453; H04W 72/0457; H04W 72/231; H04W 76/20
(Continued)

(56) References Cited

U.S. PATENT DOCUMENTS

2022/0201725 A1* 6/2022 Liu ....................... H04L 5/0053
2022/0417916 A1* 12/2022 Kim ...................... H04L 5/0078
(Continued)

FOREIGN PATENT DOCUMENTS

WO 2021/086116 A1 5/2021

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Robert J Lopata
(74) *Attorney, Agent, or Firm* — Osha Bergman Watanabe & Burton LLP

(57) ABSTRACT

A terminal according to one aspect of the present disclosure includes: a receiving section that receives a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band; and a control section that controls at least one of configuration, application, activation, and switching of a UL BWP, based on the RRC information element. According to one aspect of the present disclosure, it is possible to increase resource usage efficiency.

6 Claims, 11 Drawing Sheets

(51) Int. Cl.
*H04W 72/0457* (2023.01)
*H04W 72/231* (2023.01)

(58) Field of Classification Search
USPC .......................................................... 370/329
See application file for complete search history.

(56) References Cited

U.S. PATENT DOCUMENTS

2024/0236736 A1* 7/2024 Oh ........................ H04L 5/0057
2025/0344086 A1* 11/2025 Shim .................... H04J 11/0026

OTHER PUBLICATIONS

International Search Report issued in corresponding International Application No. PCT/JP2021/021257, mailed on Dec. 28, 2021 (5 pages).
Written Opinion issued in corresponding International Application No. PCT/JP2021/021257, mailed on Dec. 28, 2021 (3 pages).
H. Ji et al.; "Extending 5G TDD Coverage With XDD: Cross Division Duplex"; IEEE Access, vol. 9, pp. 51380-51392; Apr. 8, 2021 (13 pages).

* cited by examiner

FREQUENCY
TIME
1CC
DL
UL
TDD UL

FREQUENCY
TIME
1CC
DL
UL
DL
UL
XDD UL

FREQUENCY
TIME
1CC
DL RESOURCE
DL RESOURCE
DL RESOURCE
DL RESOURCE
UL

FREQUENCY
TIME
1CC
DL RESOURCE
UL RESOURCE
UL RESOURCE
UL RESOURCE
UL

FREQUENCY
DL
DL BWP#1
SWITCHING OF BWP
DL BWP#2
CENTER FREQUENCY
TIME
FREQUENCY
UL
UL BWP#1
UL BWP#2
CENTER FREQUENCY
TIME

FREQUENCY
DL BWP#1a
DL
DL BWP#1
CENTER FREQUENCY
DL BWP#1a
TIME
FREQUENCY
UL BWP#1a
UL
UL BWP#1
CENTER FREQUENCY
TIME

FREQUENCY
DL
DL
P_ND
DL
DL
TIME UNIT
#0
#1
TIME

FREQUENCY
DL
P_AD
DL
TIME UNIT
#0
#1
TIME

FREQUENCY
UL
UL
P_AU
TIME UNIT
#0
#1
TIME

FREQUENCY
UL
UL
P_NU
TIME UNIT
#0
#1
TIME

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is assumed that, in future radio communication systems (for example, NR), a plurality of user terminals (User Equipment (UE)) perform communication under ultra-high density high traffic environment.

Under such environment, uplink (UL) resources are assumed to be insufficient compared with downlink (DL) resources.

However, in previous NR specifications, no sufficient study has been performed about a method for increasing uplink resources. Unless the method is appropriately controlled, degradation in system performance, such as increase in latency and degradation in coverage performance, may occur.

Thus, an object of the present disclosure is to provide a terminal, a radio communication method, and a base station that increase resource usage efficiency.

Solution to Problem

A terminal according to one aspect of the present disclosure includes: a receiving section that receives a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band; and a control section that controls at least one of configuration, application, activation, and switching of a UL BWP, based on the RRC information element.

Advantageous Effects of Invention

According to one aspect of the present disclosure, it is possible to increase resource usage efficiency.

DESCRIPTION OF EMBODIMENTS

TDD Configuration

Figures 1A, 1B:
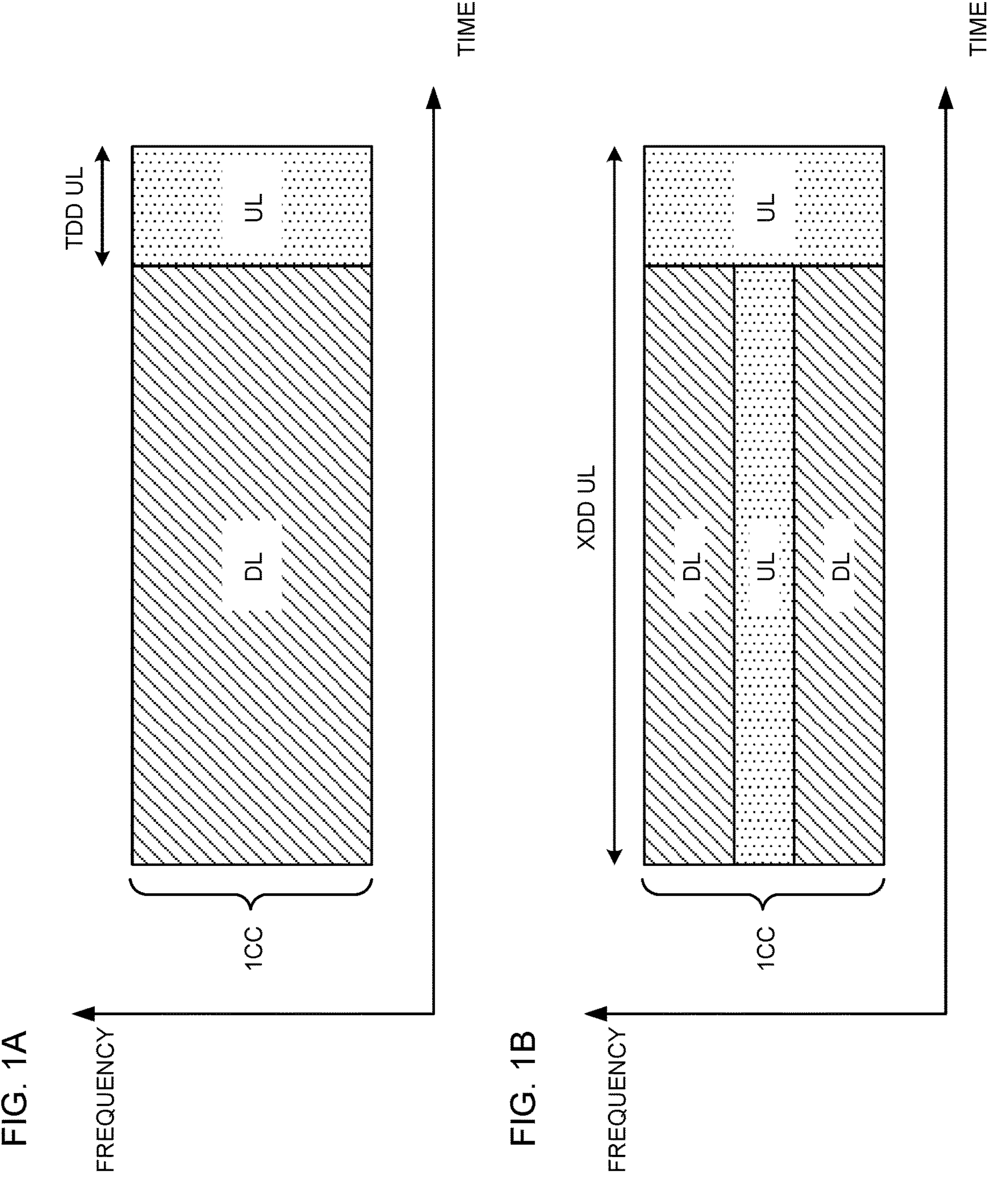
FIGS. 1A and 1B are diagrams to show examples of a configuration of a slot structure.

In Rel. 15, configurations of UL and DL (UL resources and DL resources) in time division duplex (TDD) are performed for a UE. The UE may receive a higher layer parameter related to a cell-specific UL/DL TDD configuration (TDD-UL-DL-ConfigCommon) or a higher layer parameter related to a UE-specific UL/DL TDD configuration (TDD-UL-DL-ConfigDedicated).

The higher layer parameter related to a cell-specific UL/DL TDD configuration (TDD-UL-DL-ConfigCommon) includes a parameter for configuring reference subcarrier spacing (referenceSubcarrierSpacing) and a parameter related to a TDD UL and DL pattern (TDD-UL-DL-Pattern).

TDD-UL-DL-Pattern includes a parameter for configuring periodicity of DL-UL pattern (dl-UL-TransmissionPeriodicity), a parameter for configuring the number of consecutive DL slots (nrofDownlinkSlots), a parameter for configuring the number of consecutive DL symbols (nrofDownlinkSymbols), a parameter for configuring the number of consecutive UL slots (nrofUplinkSlots), and a parameter for configuring the number of consecutive UL symbols (nrofUplinkSymbols).

By the higher layer parameter related to a UE-specific UL/DL TDD configuration (TDD-UL-DL-ConfigDedicated), configuration of slots and configuration of slot indices are performed.

The configuration of slots is performed by a parameter TDD-UL-DL-SlotConfig. TDD-UL-DL-SlotConfig includes a parameter related to a slot index (TDD-UL-DL-SlotIndex) and a parameter related to symbols constituting the slot (symbols). The parameter related to the symbols constituting the slot (symbols) configures any of a parameter indicating that all the symbols constituting the slot are used for DL (allDownlink), a parameter indicating that all the symbols constituting the slot are used for UL (allUplink), and a parameter explicitly indicating the number of symbols (explicit).

The parameter explicitly indicating the number of symbols (explicit) includes a parameter for configuring the number of DL symbols (nrofDownlinkSymbols) and a parameter for configuring the number of UL symbols (nrofUplinkSymbols).

The UE determines a slot/symbols to be used for at least one of transmission of a UL signal/channel and reception of a DL signal/channel, based on the above-described parameters.

XDD

In consideration of a time ratio of transmission and reception (for example, DL:UL=4:1) in time division duplex (TDD) in Rel. 16 or previous versions, a case with fewer transmission occasions of a UL signal/channel than reception occasions of a DL signal/channel is conceivable. In such a case, there is a concern that the UE cannot perform frequent transmission of a UL signal/channel, which delays transmission of an important UL signal/channel. It is also concerned that, since there are fewer UL transmission occasions than DL reception occasions, signals/channels are congested in the UL transmission occasions. In addition, in TDD, time resources in which a UL signal/channel can be transmitted are restricted. Hence, for example, application of a UL coverage enhancement technique using repetition transmission (Repetition) is also restricted.

For future radio communication systems (for example, Rel. 17/18 or later versions), it is studied to introduce a division duplex method combining TDD and frequency division duplex (FDD) for UL and DL.

The division duplex method may be referred to as an XDD (Cross Division Duplex). XDD may mean a duplex method in which DL and UL are frequency-division-multiplexed (DL and UL can be used simultaneously) in one component carrier (CC) of a TDD band.

FIG. 1A is a diagram to show an example of a configuration of TDD defined in Rel. 16 or previous versions. In the example shown in FIG. 1A, TDD slots/symbols are configured for a UE in the bandwidth of one component carrier (CC) (which may be referred to as a cell and a serving cell).

In the example shown in FIG. 1A, the time ratio between a DL slot and a UL slot is 4:1. In such an existing slot/symbol configuration in TDD, UL time resources cannot be sufficiently secured, which may cause UL transmission delay and degrade coverage performance.

FIG. 1B is a diagram to show an example of a structure of XDD. In the example in FIG. 1B, resources used for DL reception and resources used for UL transmission overlap in terms of time in one component carrier (CC). With such a structure of resources, it is possible to secure UL resources and consequently improve resource usage efficiency.

For example, as in the example shown in FIG. 1B, by configuring both end resources of the frequency domain in one CC for DL to sandwich UL resources between the DL resources, occurrence of cross link interference (CLI) with neighbor carriers can be prevented and mitigated. A region for guard may be configured at one or more borders between the DL resources and UL resources.

By considering complexity of processing of self-interference, it is conceivable that only a base station uses DL resources and UL resources simultaneously. In other words, it may be configured that a certain UE uses DL resources while another UE uses UL resources in resources where DL and UL overlap in terms of time.

Figure 2:
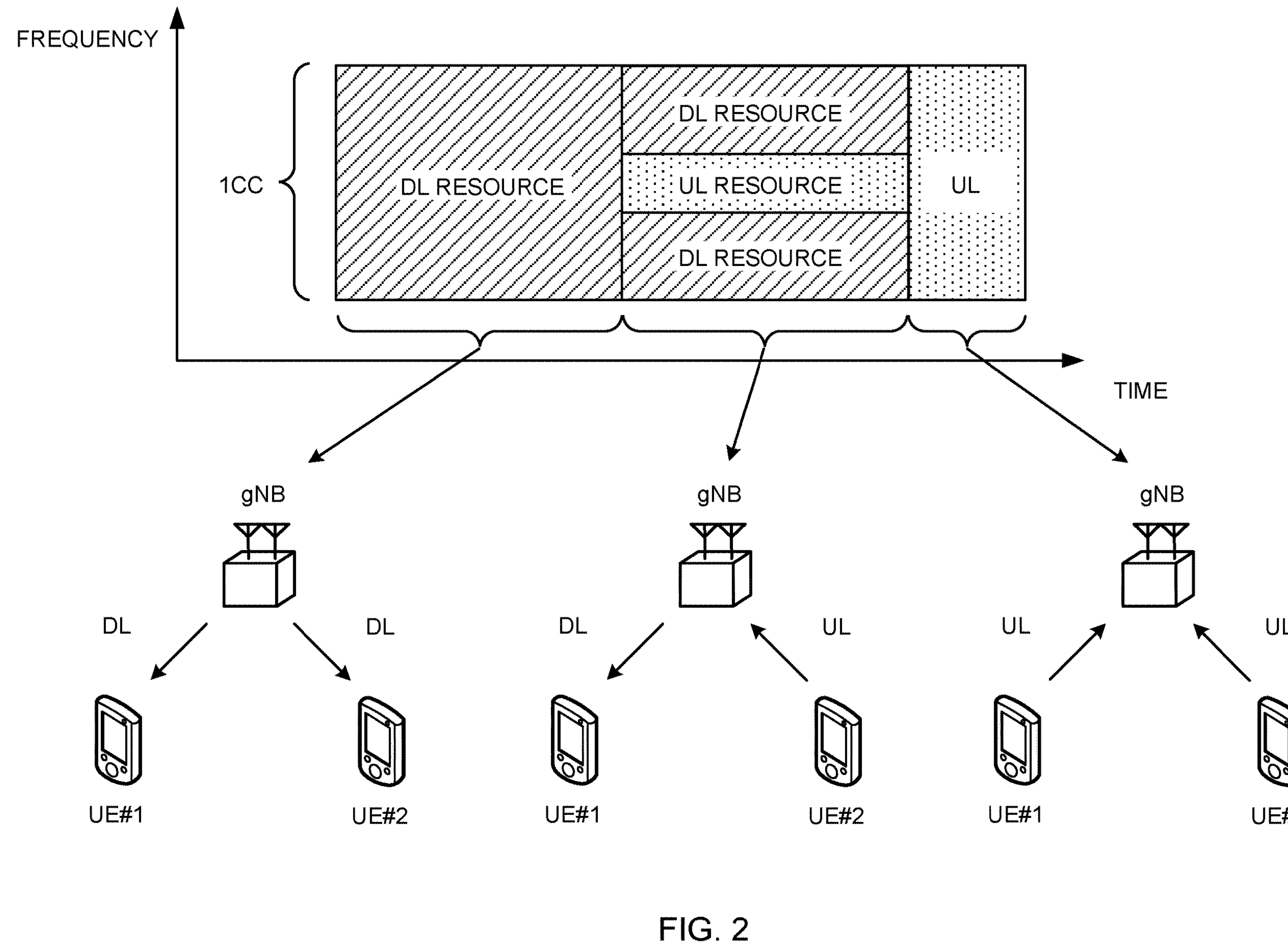
FIG. 2 is a diagram to show an example of a structure of XDD.

FIG. 2 is a diagram to show an example of a structure of XDD. In the example shown in FIG. 2, it is configured that part of DL resources in a TDD band is allocated as UL resources and DL and UL partially overlap in terms of time.

In the example shown in FIG. 2, in a period for only DL, each of a plurality of UEs (UE #1 and UE #2 in FIG. 2) receives a DL channel/signal.

In the period where DL and UL overlap in terms of time, a certain UE (UE #1 in the example in FIG. 2) receives a DL channel/signal while another UE (UE #2 in the example in FIG. 2) transmits a UL channel/signal. In this period, a base station performs simultaneous transmission and reception of DL and UL.

Moreover, in a period for UL only, each of a plurality of UEs transmits a UL channel/signal.

In existing NR (for example, those defined in Rel. 15/16 or previous versions), DL frequency resources and UL frequency resources in a carrier for UE are configured as a DL bandwidth part (BWP) and a UL BWP, respectively. To switch DL/UL frequency resources to other DL/UL frequency resources, a configuration of a plurality of BWPs and a mechanism of adaptation of BWPs are needed.

In existing NR, time resources in a TDD carrier for UE are configured as at least one of DL, UL, and flexible (FL) in a TDD configuration.

A method of configuring resources of the time domain and the frequency domain for XDD operation has been studied. For example, for UE #1 in FIG. 2, by configuring resources in XDD (period where DL and UL overlap) in a similar manner to existing DL resources (for example, by avoiding using part corresponding to UL resources by using frequency domain resource assignment (FDRA)), an influence on specifications/UE can be minimized (refer to FIG. 3A).

Figures 3A, 3B:
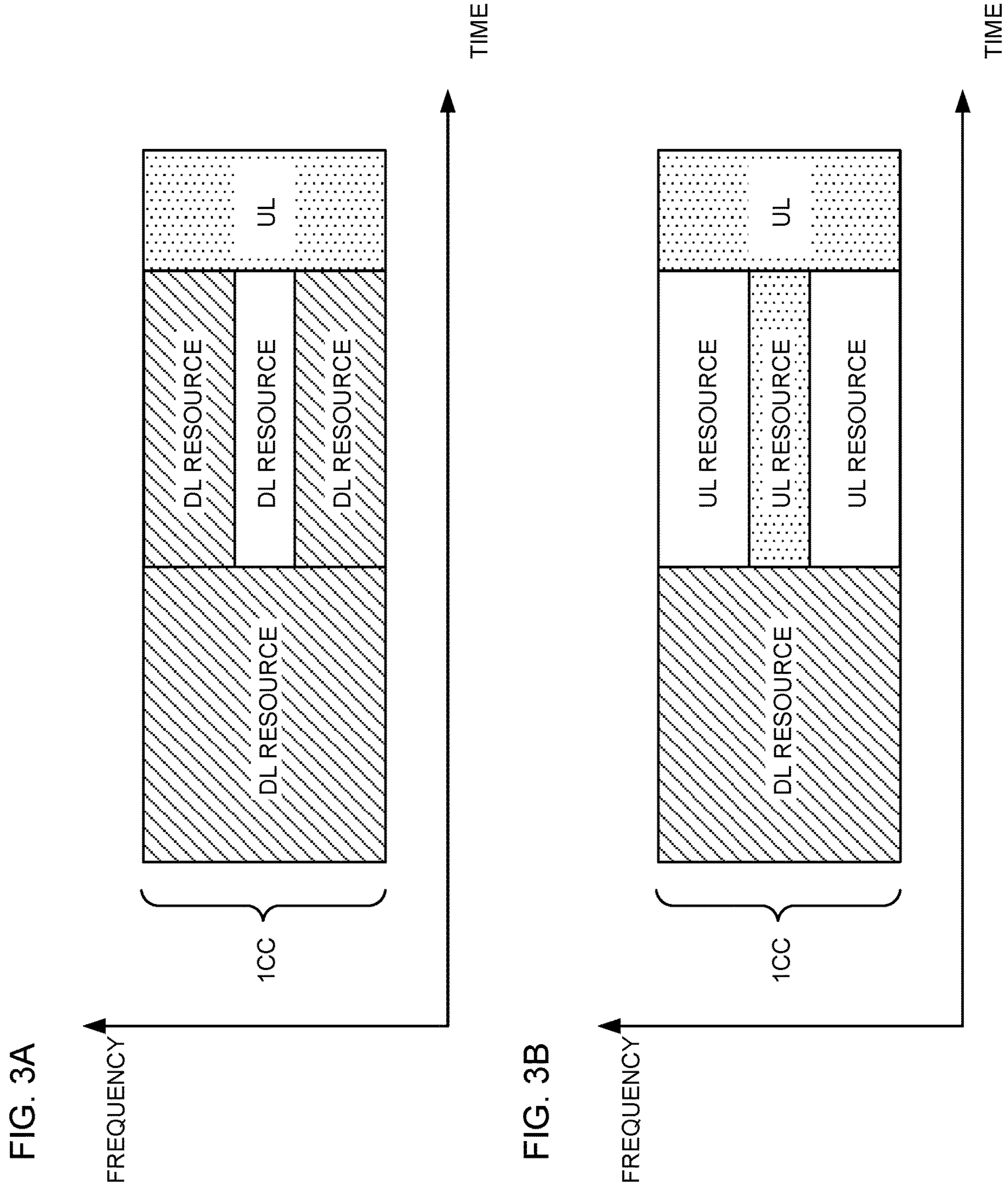
FIGS. 3A and 3B are diagrams to show examples of a configuration of resources of the time domain and the frequency domain for XDD operation.

For example, for UE #2 in FIG. 2, by configuring resources in XDD in a similar manner to existing UL resources (for example, by avoiding using part corresponding to DL resources by using frequency domain resource assignment (FDRA)), an influence on specifications/UE can be minimized (refer to FIG. 3B).

However, each UE needs to recognize whether resources are used for XDD operation.

For example, part of the TDD band where DL and UL overlap (which may be referred to as an XDD part) may be configured as DL for UE #1 as that shown in FIG. 2. However, it is not clear whether to configure frequency resources in the XDD part separately, from the frequency resources in the part for DL only (for example, DL part other than XDD part).

UL part of the frequency resources in the XDD part may be used by another UE (for example, UE #2 in FIG. 2) for UL transmission. Hence, it is concerned that, when DL reception is performed in this part (UL part in the XDD part), CLI may occur. It is also studied that, to allocate resources other than this part to a single UE, DL resource assignment to this part is disabled.

In other words, it is considered that DL resources in XDD need be configured separately from DL in the TDD band.

It is studied to introduce, in a case where DL resources in XDD and DL resources not in XDD need be processed separately, a BWP adaptation mechanism for switching these resources by configuring these resources as separate frequency resources (for example, DL BWPs).

However, requiring UE capability for configuration of a plurality of BWPs and BWP adaptation is considered not to be preferable since a function necessary for XDD operation and a function necessary for operation related to the plurality of BWPS are different from each other.

The above is considered to be similarly applicable to UL. For example, part of the TDD band where DL and UL overlap (which may be referred to as an XDD part) may be configured as UL for UE #2 as that shown in FIG. 2. However, it is not clear whether to configure frequency resources in the XDD part separately, from the frequency resources in the part for UL only (for example, UL part other than XDD part).

For example, to minimize negative effects of CLI, it is studied to configure UL transmission (for example, filtering) in an XDD part in a structure different from that for UL resources not being an XDD part.

In other words, it is considered that UL resources in XDD need be configured separately from UL in the TDD band.

It is studied to introduce, in a case where UL resources in XDD and UL resources not in XDD need be processed separately, a BWP adaptation mechanism for switching these resources by configuring these resources as separate frequency resources (for example, UL BWPs).

However, requiring existing UE capability for configuration of a plurality of BWPs and BWP adaptation for XDD operation is considered not to be preferable since a function necessary for XDD operation and a function necessary for operation related to the plurality of BWPs are different from each other.

In addition, it is not clear whether each UE can use part of frequency resources when a link direction (DL/UL/flexible) is configured/indicated. Unless availability of frequency resources is clear, appropriate transmission/reception cannot be performed, and communication quality/communication throughput may degrade.

Thus, the inventors of the present invention came up with the idea of a method of controlling XDD operation without at least one of exceeding UE capability and inefficiency (for example, BWP switching delay) and a method of controlling a link direction and availability of partial frequency resources.

Embodiments according to the present disclosure will be described in detail with reference to the drawings as follows. The radio communication methods according to respective embodiments may each be employed individually, or may be employed in combination.

Radio Communication Method

A DL signal/channel in the present disclosure may be transmitted by employing unicast or may be transmitted by employing multicast/broadcast for a plurality of UEs. Configuration of the multicast/broadcast/unicast may be performed by using higher layer signaling.

In the present disclosure, A/B may mean at least one of A and B. In the present disclosure, "A/B/C" may mean "at least one of A, B, and C."

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that in the present disclosure, a port, an antenna, an antenna port, a panel, a beam, an Uplink (UL) transmission entity, a transmission/reception point (TRP), spatial relation information, a spatial relation, a transmission configuration indication (or transmission configuration indicator) (TCI) state (TCI state (TCI-state)), quasi-co-location (QCL) assumption, a control resource set (CORESET), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, a CORESET group, a panel group, a beam group, a spatial relation group, or a PUCCH group), and a CORESET pool may be interchangeably interpreted.

In the present disclosure, reception of a DL signal/channel and transmission of a UL signal/channel may be transmitted/received by using the same BWP/CC/band/operating band or may be transmitted/received by using different BWPs/CCs/bands/operating bands. In the drawings of the present disclosure below, a structure in one CC will be described, but the number of frequency direction resources is not limited to this. In the present disclosure, a BWP, a CC, a cell, a serving cell, a band, a carrier, an operating band, a PRG, a PRB, an RB, an RE, and a resource may be interchangeably interpreted.

In the present disclosure, "A and B overlap" and "at least part of A overlaps at least part of B" may be interchangeably interpreted.

Note that each of the embodiments of the present disclosure may be applied under at least one of the conditions indicating a case where a UE reports, to a NW, UE capability corresponding to at least one function/capability in the embodiment and a case where the UE is configured/activated/indicated with UE capability corresponding to at least one function/capability in the embodiment by higher layer signaling. Each of the embodiments of the present disclosure may be applied when a particular higher layer parameter is configured/activated/indicated for the UE.

In the present disclosure, a time domain (period) in which DL resources and UL resources in one CC of a TDD band can be used simultaneously, XDD part, and an XDD period may be interchangeably interpreted. The DL/UL resources in the XDD part may be referred to as XDD DL/UL resources and XDD DL/UL. DL/UL resources in the TDD band where DL and UL do not overlap in terms of time may be interpreted as non-XDD DL/UL resources, pure DL/UL resources, DL/UL resources not being in XDD, new DL/UL resources, and the like. XDD operation may indicate operation in a period where XDD DL/UL resources are configured or may indicate operation of the entire TDD in which XDD can be employed.

In the present disclosure, a DL/UL BWP in a TDD band, a DL/UL BWP defined in Rel. 15/16 or previous versions, and a normal DL/UL BWP may be interchangeably interpreted.

In the present disclosure, drop, stop, cancel, puncture, rate match, and the like may be interchangeably interpreted.

First Embodiment

In a first embodiment, a description will be given of XDD DL frequency resources.

Embodiment 1-1

Embodiment 1-1-1

In Embodiment 1-1, a DL BWP (new DL BWP, DL BWP for XDD) using contiguous or discontinuous PRBs may be configured in XDD operation. In the XDD operation, a UE may be configured with a DL BWP by using contiguous or discontinuous PRBs.

In the present disclosure, a description will be mainly given of an example where one UL resource is allocated so as to be sandwiched by two DL resources in the frequency domain in one CC in a BWP using XDD as shown in FIG. 2. However, arrangement/allocation of DL/UL resources is not limited to this example. One DL resource may be allocated so as to be sandwiched by two UL resources. Two DL resources being allocated in the frequency domain in one CC may mean a DL BWP using discontinuous PRBs being configured. In contrast, one DL resource being allocated in the frequency domain in one CC may mean a DL BWP using contiguous PRBs being configured.

For configuration of PRBs of a DL BWP, the UE may be configured with total frequency resources (contiguous frequency resources including a frequency resource usable for DL and a frequency resource not usable for DL) and a frequency resource not usable for a DL resource. The total frequency resources may be configured by using an existing BWP parameter, for example, a start (position of) PRB and the number of PRBs (bandwidth). The frequency resource not usable for a DL resource may be configured by using a start (position of) PRB and the number of PRBs (bandwidth), for example.

For configuration of the PRBs of the DL BWP, the UE may be configured with an available frequency resource. The frequency resource not usable for a DL resource may be configured by using a plurality of (for example, two) sets of a start (position of) PRB and the number of PRBs (bandwidth), for example.

Embodiment 1-1-2

Configuration of a new DL BWP may be configured as a supplementary DL BWP for a normal DL BWP. The supplementary DL BWP may be associated with the normal DL BWP. The supplementary DL BWP may be referred to as a supplemental DL BWP, an additional DL BWP, and the like.

A configuration restriction may be defined for the normal DL BWP and the supplemental DL BWP. For example, at least one of a center frequency, subcarrier spacing, a subset for a frequency resource (start position/bandwidth), and a configuration related to DL BWP configuration may be common to the normal DL BWP and the supplemental DL BWP. The configuration related to DL BWP configuration may be at least one of a PDCCH configuration (PDCCH Config), a PDSCH configuration (PDSCH Config), an SPS configuration (SPS Config), and a radio link monitoring (RLM) configuration (RLM Config), for example. For example, at least one of a center frequency, subcarrier spacing, a subset for a frequency resource (start position/bandwidth), and a configuration related to BWP configuration may be separately configured for the normal DL BWP and the supplemental DL BWP.

Association between the new DL BWP (supplementary DL BWP) and the normal DL BWP may be configured by the ratio of particular numbers. The new DL BWP(s) (supplementary DL BWP(s)) and the normal DL BWP(s) may be associated as 1:1, may be associated as 1:N (N is an integer of 2 or greater), may be associated as N:1, or may be associated as N:M (M is an integer of 2 or greater, N and M may be N=M).

Configuration of the new DL BWP need not be associated with the normal DL BWP.

Embodiment 1-1-3

Configuration of a DL BWP may be performed in combination with a UL BWP (new UL BWP, UL BWP for XDD, paired UL BWP) constituted of PRBs not allocated to the DL BWP.

Configuration of a new DL BWP may be performed in combination with at least one of configuration of a UL BWP in XDD (new UL BWP) or configuration of a normal UL BWP.

The configuration of a new DL BWP need not be associated with the configuration of a new UL BWP. In other words, the configuration of a new DL BWP and the configuration of a new UL BWP may be performed separately.

Note that the relation between the configuration of a DL BWP for XDD and the configuration of a related UL BWP may have the same restriction as that between the configuration of a normal DL BWP and the configuration of a normal UL BWP. The relation between the configuration of a DL BWP for XDD and the configuration of a related UL BWP may have a different restriction from that between the configuration of a normal DL BWP and the configuration of a normal UL BWP. For example, the restriction may be that the configuration of a DL BWP for XDD and the configuration of a related UL BWP have different center frequencies. The restriction may be that PRBs do not overlap in the frequency domain in the configuration of a DL BWP for XDD and the configuration of a related UL BWP.

Embodiment 1-2

In Embodiment 1-2, a semi-static configuration of a switching pattern for a DL BWP in the time domain may be supported.

According to the switching pattern, switching between a pure DL resource (all the frequencies in the DL resource correspond to DL resources/DL BWP available for DL) and DL resources in XDD (new DL BWP) can be performed without requiring dynamic BWP switch indication and a delay time necessary for existing switching.

Embodiment 1-2-1

The switching pattern for a DL BWP may be performed based on a TDD configuration.

The UE may determine/judge a switching pattern for a DL BWP, based on an RRC information element related to a TDD configuration (for example, TDD-UL-DL-Config). For example, the switching pattern for a DL BWP may be included in the RRC information element related to the TDD configuration (for example, TDD-UL-DL-Config).

For example, information related to DL/UL related to XDD may be included in the RRC information element related to the TDD configuration (for example, TDD-UL-DL-Config), in addition to normal DL/UL/FL.

In the present disclosure, DL/UL related to XDD, a non-available DL/UL resource, an available DL/UL resource, XDD DL/UL, partial DL/UL, a partially available DL/UL resource, a partially non-available DL/UL resource, an invalid DL/UL resource, an invalid resource block, an invalid resource block pattern, and a partial pattern may be interchangeably interpreted.

The UE may determine/judge a switching pattern for a DL BWP, based on an RRC information element related to a BWP configuration (for example, BWP-Config). For example, the switching pattern for a DL BWP may be included in the RRC information element related to the BWP configuration (for example, BWP-Config).

For example, periodicity and a (time) offset of a DL resource in XDD may be included in the RRC information element related to the BWP configuration (for example, BWP-Config). The periodicity and offset may be expressed in units of specific time (for example, slot, symbol) or may be indicated by any time.

The UE may determine/judge a switching pattern for a DL BWP, based on an RRC information element related to a BWP configuration in XDD. The RRC control element may be a parameter defined in Rel. 17 or later versions or a parameter other than an existing RRC information element related to a TDD configuration (for example, TDD-UL-DL-Config) and an RRC information element related to a BWP configuration (for example, BWP-Config).

Embodiment 1-2-2

A restriction related to the configuration of a switching pattern for a DL BWP may be defined.

A restriction related to the location of an XDD DL resource in the time domain may be defined. For example, a DL resource in XDD may be restricted so as to be configured at least one of after a normal DL resource or before a normal UL resource in terms of time.

For example, a DL resource in XDD may be restricted so as to be configured only in specific resources. The specific resources may be, for example, resources (for example, slots) to which UL and DL are allocated. The specific resources may be, for example, resources (for example, slots) in which a part other than a DL resource in XDD is a normal UL resource (symbols). The specific resources may be, for example, slots not including an SS/PBCH block.

For example, a DL resource in XDD may be restricted so as to be configured at least one of before a normal DL resource or after a normal UL resource in terms of time.

An existing DL/UL BWP configuration and BWP switching (defined in Rel. 15/16) are performed based on configuration/indication from a network (for example, a base station). The existing DL/UL BWP configuration and BWP switching may be performed based on a certain timer and a specific DCI format (for example, any one of DCI formats 0_1, 0_2, 1_1, and 1_2).

Figures 4A, 4B:
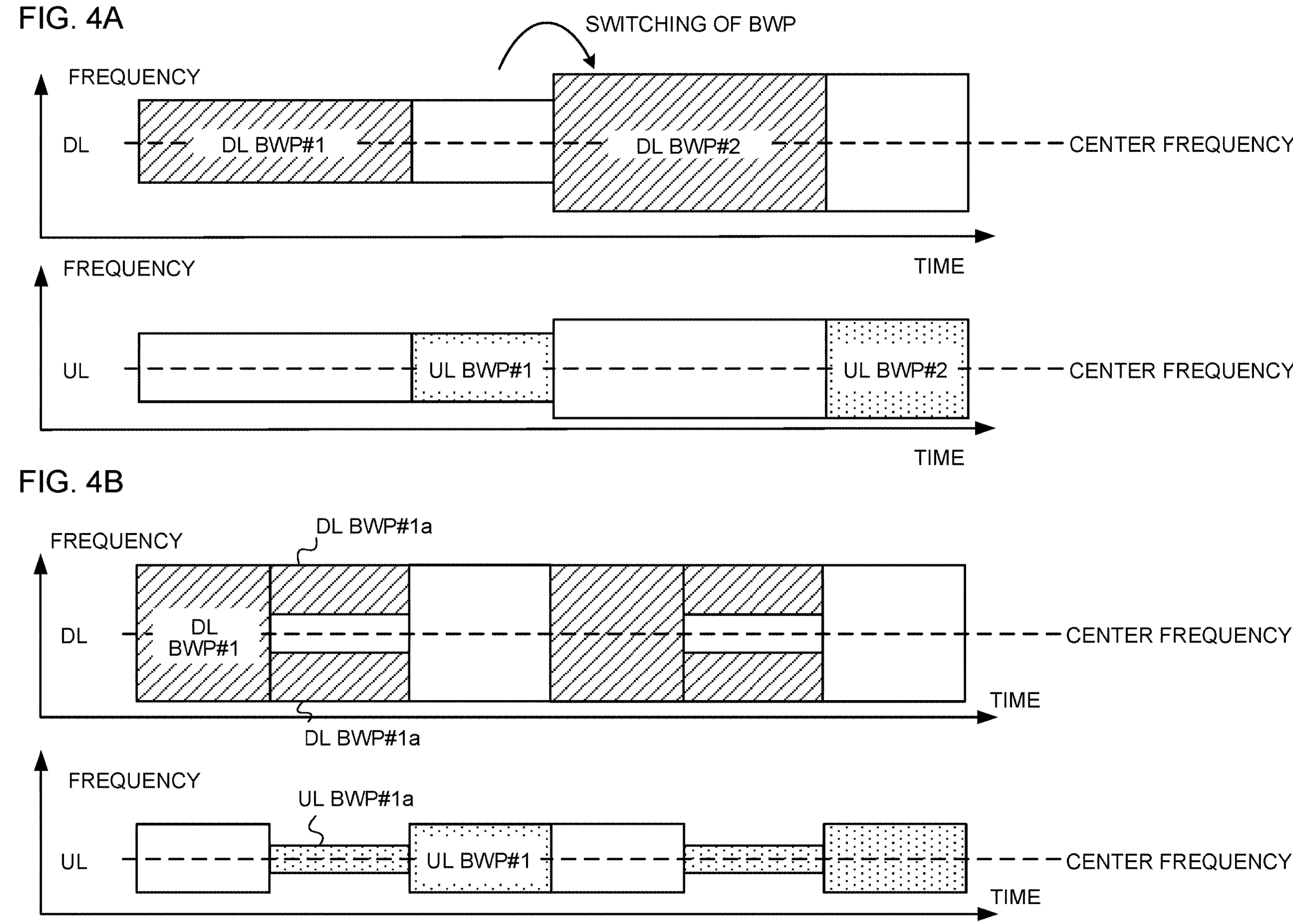
FIGS. 4A and 4B are diagrams to show examples of DL/UL BWP switching.

FIG. 4A is a diagram to show an example of existing DL/UL BWP (corresponding to a pure DL BWP and a pure UL BWP) switching. In the example shown in FIG. 4A, the UE performs DL/UL BWP switching in TDD (switching from DL BWP #1 to DL BWP #2 and switching from UL BWP #1 to UL BWP #2), based on a certain timer/specific DCI. In the diagram in FIG. 4A, a frequency-direction resource of each BWP increases as a result of the switching.

Note that, in the diagram shown in FIG. 4A, the center frequency of the DL BWPs and the center frequency of the UL BWPs in TDD are equal, which are indicated by broken lines. Also in the diagram shown in FIG. 4B, the center frequency of the DL BWPs and the center frequency of the UL BWPs in TDD are equal, which are indicated by broken lines. In the present disclosure, a case where the center frequencies of the DL BWPs and the UL BWPs are equal will be described. However, the center frequencies of the DL BWPs and the UL BWPs may be different from each other.

A DL/UL BWP configuration and BWP switching in XDD will be described below.

The UE may be configured with DL/UL BWPs (BWP pattern) in XDD by using higher layer signaling (RRC signaling). The UE may be configured/indicated with XDD DL/UL BWP configuration and BWP switching, based on at least one of a BWP switching pattern configuration included in an RRC configuration, a certain timer, and a specific DCI format (for example, a BWP configuration/indication included in DCI).

FIG. 4B is a diagram to show an example of DL/UL BWP switching in XDD. In the example shown in FIG. 4B, the UE is configured with DL BWP #1 as a pure DL BWP and DL BWP #1*a* as a DL BWP in XDD. In the example shown in FIG. 4B, the UE is configured with UL BWP #1 as a pure UL BWP and UL BWP #1*a* as a UL BWP in XDD.

DL BWP #1 and DL BWP #1*a* may be associated with each other. UL BWP #1 and UL BWP #la may be associated with each other. DL BWP #1 and UL BWP #1 may be associated with each other. DL BWP #1*a* and UL BWP #1*a* may be associated with each other.

In the example shown in FIG. 4B, the UE is configured with a DL/UL BWP switching pattern. The switching pattern may be information for configuring switching between DL/UL BWP #1 and DL/UL BWP #1*a*. The switching pattern may be information indicating at least one of timing of switching between a normal DL/UL resource and a DL/UL resource in XDD and periodicity of a structure including a normal DL/UL resource and a DL/UL resource in XDD. The UE determines/judges DL and UL resources, based on the switching pattern.

Embodiment 1-3

In Embodiment 1-3, dynamic DL BWP adaptation between a pure DL resource and a DL resource in XDD may be supported.

The UE may determine/judge to perform the dynamic DL BWP adaptation between a pure DL resource and a DL resource in XDD, based on at least one of DCI, a MAC CE, and a specific condition.

Dynamic adaptation of a DL BWP for XDD may mean switching between a normal DL BWP and a DL BWP in XDD.

The dynamic adaptation of a DL BWP for XDD may mean activation/deactivation of a DL BWP in XDD related to a normal DL BWP.

The UE may receive an indication related to DL BWP adaptation and thereafter apply DL BWP adaptation only in a specific period (Embodiment 1-3-1). The specific period may be one or more slots/symbols. The specific period may be indicated by an offset from a slot/symbol in which the indication is transmitted/received. The specific period may be indicated by a specific number of slots/symbols. The specific period/offset may be defined in advance in a specification, may be configured/notified by higher layer signaling, or may be dynamically indicated by DCI.

The UE may receive an indication related to DL BWP adaptation and thereafter apply DL BWP adaptation until receiving the next indication related to DL BWP adaptation (Embodiment 1-3-2). In other words, the UE may receive an indication related to DL BWP adaptation and thereafter apply DL BWP adaptation until receiving an indication indicating cancellation/override of the indication.

The UE may receive an indication related to DL BWP adaptation and thereafter apply DL BWP adaptation until a specific condition is satisfied (Embodiment 1-3-3). The specific condition may be expiration of a specific timer, for example.

At least two of the methods described in Embodiments 1-3-1 to 1-3-3 above may be applied in combination.

At least one of switching delay related to BWP adaptation and a mechanism/condition of indication may be the same as or different from at least one of existing switching delay and mechanism/condition of indication (defined in Rel. 15/16). For example, delay required for switching of DL BWP adaptation in XDD may be configured/defined to be shorter (or longer) than an existing delay time.

Figure 5:
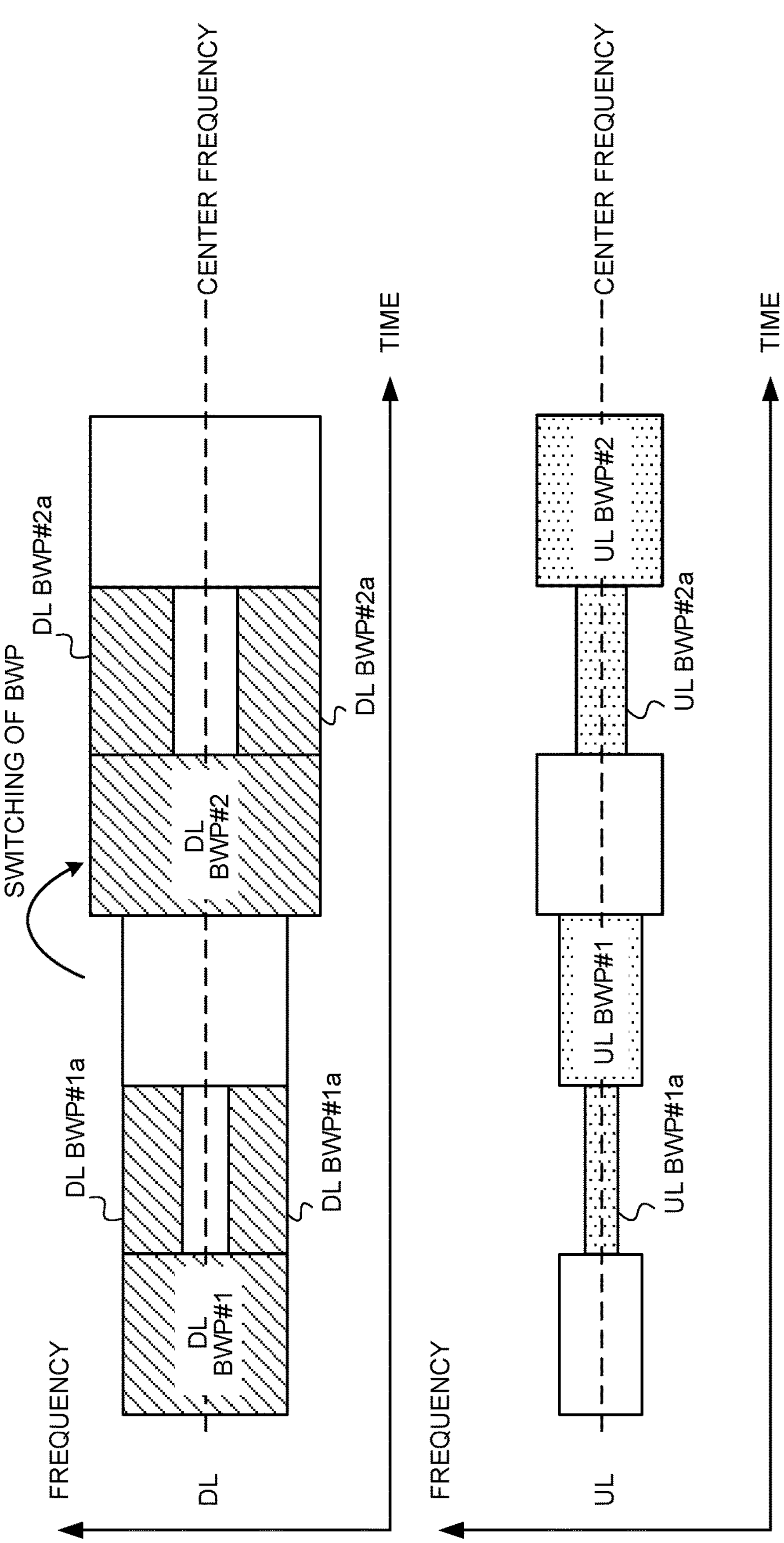
FIG. 5 is a diagram to show an example of a schedule method according to Embodiment 2-6-2.

FIG. 5 is a diagram to show an example of BWP adaptation in XDD. In the example shown in FIG. 5, the UE is configured with DL BWP #1 and DL BWP #2 as pure DL BWPs. The UE is configured with DL BWP #1*a* and DL BWP #2*a* as DL BWPs in XDD. The UE is configured with UL BWP #1 and UL BWP #2 as pure UL BWPs. The UE is configured with UL BWP #1*a* and UL BWP #2*a* as UL BWPs in XDD.

Note that, in the example shown in FIG. 5, as in FIGS. 4A and 4B, the center frequencies of the DL BWPs and UL BWPs are indicated by broken lines and match between DL and UL.

DL BWP #1 and DL BWP #1*a* may be associated with each other. UL BWP #1 and UL BWP #1*a* may be associated with each other.

DL BWP #2 and DL BWP #2*a* may be associated with each other. UL BWP #2 and UL BWP #2*a* may be associated with each other.

DL BWP #1 and UL BWP #1 may be associated with each other. DL BWP #1*a* and UL BWP #1*a* may be associated with each other.

DL BWP #2 and UL BWP #2 may be associated with each other. DL BWP #2*a* and UL BWP #2*a* may be associated with each other.

In the example shown in FIG. 5, the UE receives an indication related to DL/UL BWP adaptation. The UE performs DL/UL BWP switching, based on the indication, for example. For example, the UE performs switching between DL/UL BWP #1 and DL/UL BWP #1*a* and switching between DL/UL BWP #2 and DL/UL BWP #2*a*, based on the indication.

In the example shown in FIG. 5, the UE receives information indicating switching between DL/UL BWP #1 and DL/UL BWP #2. In the present disclosure, existing BWP switching and switching between a normal DL/UL BWP and a DL/UL BWP in XDD may be performed in combination. The combination of switching may be performed by using a common RRC information element/MAC CE/DCI or may be performed by using different RRC information elements/MAC CEs/pieces of DCI.

Note that, in each of the examples shown in FIGS. 4A and 4B and FIG. 5 described above, an example where the bandwidth of a UL BWP is narrower (smaller) than the bandwidth of a DL BWP is described. However, it may be configured that the bandwidth of a DL BWP and the bandwidth of a UL BWP are equal or the bandwidth of a DL BWP is narrower than the bandwidth of a UL BWP. For example, by configuring the bandwidth of a UL BWP to be narrower than the bandwidth of a DL BWP, it is preferably applicable from the viewpoint of UL coverage and DL communication capacity.

Embodiment 1-4

UE capability for supporting at least one of DL BWP configuration and adaptation in XDD operation may be defined. The UE capability may be UE capability common to or different from UE capability for supporting at least one of UL BWP configuration and adaptation in XDD operation.

The UE capability may be different from UE capability related to operation related to a plurality of BWPs. The UE capability may be capability supported by a UE supporting UE capability related to operation related to a plurality of BWPs.

The UE capability may be reported to a network for each UE/each band/each band in units of a plurality of bands/each feature set (FS) (each band in units of a combination of a plurality of bands)/each cell in units of FS (each CC for each band in units of a combination of a plurality of bands).

When a DL BWP in XDD is configured/activated for a specific period (for example, a slot/symbol), the UE may interpret frequency domain resource assignment (FDRA) in the specific period similarly to a corresponding normal DL BWP. Specifically, (numbering/ordering of) PRB indices assigned to a normal DL BWP and a DL BWP in XDD may be the same. In this case, the UE may assume that no DL channel/signal is allocated to any non-available PRB by FDRA. Alternatively, the UE need not perform, even when a DL channel/signal is allocated to a non-available PRB by FDRA, reception processing on the DL channel/signal in the allocated part.

When a DL BWP in XDD is configured/activated for a specific period, the UE may interpret FDRA in the specific period differently from a corresponding normal DL BWP. Specifically, (numbering/ordering of) PRB indices assigned to a normal DL BWP and a DL BWP in XDD may be different from each other. Regarding PRBs in a DL BWP in XDD, numbering/ordering of PRB indices need not be performed for a non-available PRB compared with a corresponding normal DL BWP. In this case, the PRBs of the DL BWP in XDD may be referred to as virtually contiguous PRBs.

Note that, although a description has been given by limiting to PRBs above, resources are not limited to these.

When at least part of DL channels/signals is configured/scheduled outside the configured/activated DL BWP in XDD, the UE need not assume (expect) to receive the DL channels/signals.

When at least part of DL channels/signals is configured/scheduled outside the configured/activated DL BWP in XDD, the UE need not assume (expect) to receive the at least part of DL channels/signals configured/scheduled outside the DL BWP. In this case, the UE may perform puncturing/rate matching on the DL channels/signals. The puncturing/rate matching may be performed based on a specification or may be configured/notified by higher layer signaling (RRC signaling).

Note that, in the present disclosure, the UE need not assume (expect) that transmission/reception (for example, repetition transmission/reception (repetition), semi-persistent scheduling (SPS)) over at least one boundary among the boundary between a normal DL/UL BWP and a DL/UL BWP in XDD, the boundary at which DL/UL BWP switching is performed, and a slot boundary is scheduled/configured/activated.

In the present disclosure, when transmission/reception over at least one boundary among the boundary between a normal DL/UL BWP and a DL/UL BWP in XDD, the boundary at which DL/UL BWP switching is performed, and a slot boundary is scheduled/configured/activated, the UE may cancel the transmission/reception. The UE may judge the cancellation, based on timing of the boundary (specifically, cancellation of part of the transmission/reception) or may judge the cancellation irrespective of the timing of the boundary (specifically, cancellation of the entire transmission/reception).

According to the first embodiment above, it is possible to appropriately perform configuration of a DL BWP in XDD operation.

Second Embodiment

In a second embodiment, a description will be given of XDD UL frequency resources.

Embodiment 2-1

Embodiment 2-1-1

In Embodiment 2-1, configuration of a UL BWP (new UL BWP, UL BWP for XDD) may be performed by using contiguous or discontinuous PRBs in XDD operation. In the XDD operation, a UE may be configured with a UL BWP by using contiguous or discontinuous PRBs.

As described in Embodiment 1-1-1 above, a description will be mainly given of an example where one UL resource is allocated so as to be sandwiched by two DL resources in the frequency domain in one CC as shown in FIG. 2. However, arrangement/allocation of DL/UL resources is not limited to this example. One DL resource may be allocated so as to be sandwiched by two UL resources. One UL resource being allocated in the frequency domain in one CC may mean a UL BWP using contiguous PRBs being configured. In contrast, two UL resources being allocated in the frequency domain in one CC may mean a UL BWP using discontinuous PRBs being configured. For example, by allocating two UL resources in the frequency domain in one CC, frequency hopping of UL transmission can be applied suitably.

In this case, the UE may recognize that a UL BWP in XDD and a normal UL BWP have different structures. The UE may perform UL BWP switching without dynamic indication/switching delay related to a normal UL BWP.

For configuration of PRBs of a UL BWP, the UE may be configured with total frequency resources (contiguous frequency resources including a frequency resource usable for UL and a frequency resource not usable for UL) and a frequency resource (start position/bandwidth) not usable for a UL resource. The total frequency resources may be configured by using an existing BWP parameter, for example, a start (position of) PRB and the number of PRBs (bandwidth). The frequency resource not usable for a UL resource may be configured by using a start (position of) PRB and the number of PRBs (bandwidth), for example.

For configuration of the PRBs of the UL BWP, the UE may be configured with an available frequency resource (start position/bandwidth). The frequency resource not usable for a UL resource may be configured by using a plurality of (for example, two) sets of a start (position of) PRB and the number of PRBs (bandwidth), for example.

Embodiment 2-1-2

Configuration of a new UL BWP may be configured as a supplementary UL BWP for a normal UL BWP. The supplementary UL BWP may be associated with the normal UL BWP. The supplementary UL BWP may be referred to as a supplemental UL BWP, an additional UL BWP, and the like.

A configuration restriction may be defined for the normal UL BWP and the supplemental UL BWP. For example, at least one of a center frequency, subcarrier spacing, a subset for a frequency resource (start position/bandwidth), and a configuration related to UL BWP configuration may be common to the normal UL BWP and the supplemental UL BWP. The configuration related to UL BWP configuration may be at least one of a PUCCH configuration (PUCCH Config), a PUSCH configuration (PUSCH Config), a configured grant configuration (Configured grant config), an SRS configuration (SRS Config), and a radio link monitoring (RLM) configuration (RLM Config), for example. For example, at least one of a center frequency, subcarrier spacing, a subset for a frequency resource (start position/bandwidth), and a configuration related to BWP configuration may be separately configured for the normal UL BWP and the supplemental UL BWP.

Association between the new UL BWP (supplementary UL BWP) and the normal UL BWP may be configured by the ratio of particular numbers. The new UL BWP (s) (supplementary UL BWP (s)) and the normal UL BWP(s) may be associated as 1:1, may be associated as 1:N (N is an integer of 2 or greater), may be associated as N:1, or may be associated as N:M (M is an integer of 2 or greater, N and M may be N=M).

The new UL BWP may be configured by configuration of a UL BWP not associated with the normal UL BWP.

Embodiment 2-1-3

Configuration of a UL BWP may be performed in combination with a DL BWP (new DL BWP, DL BWP for XDD, paired DL BWP) constituted of PRBs not allocated to the UL BWP.

Configuration of a new UL BWP may be performed in combination with at least one of configuration of a DL BWP in XDD or configuration of a normal DL BWP.

The configuration of a new UL BWP need not be associated with the configuration of a new DL BWP. In other words, the configuration of a new UL BWP and the configuration of a new DL BWP may be performed separately.

Note that the relation between the configuration of a UL BWP for XDD and the configuration of a related DL BWP may have the same restriction as that between the configuration of a normal UL BWP and the configuration of a normal DL BWP. The relation between the configuration of a UL BWP for XDD and the configuration of a related DL BWP may have a different restriction from that between the configuration of a normal UL BWP and the configuration of a normal DL BWP. For example, the restriction may be that the configuration of a UL BWP for XDD and the configuration of a related DL BWP have different center frequencies. The restriction may be that PRBs do not overlap in the frequency domain in the configuration of a UL BWP for XDD and the configuration of a related DL BWP.

Embodiment 2-2

In Embodiment 2-2, a semi-static configuration of a switching pattern for a UL BWP in the time domain may be supported.

According to the switching pattern, switching between a pure UL resource (all the frequencies in the UL resource correspond to UL resources/UL BWP available for UL) and UL resources in XDD (new UL BWP) can be performed without requiring dynamic BWP switch indication and a delay time necessary for existing switching.

Embodiment 2-2-1

The switching pattern for a UL BWP may be performed based on a TDD configuration.

The UE may determine/judge a switching pattern for a DL BWP, based on an RRC information element related to a TDD configuration (for example, TDD-UL-DL-Config). For example, the switching pattern for a UL BWP may be included in the RRC information element related to the TDD configuration (for example, TDD-UL-DL-Config).

For example, information related to DL/UL related to XDD may be included in the RRC information element related to the TDD configuration (for example, TDD-UL-DL-Config), in addition to normal DL/UL/FL.

In the present disclosure, DL/UL related to XDD, a non-available DL/UL resource, an available DL/UL resource, XDD DL/UL, partial DL/UL, a partially available DL/UL resource, a partially non-available DL/UL resource, an invalid DL/UL resource, an invalid resource block, an invalid resource block pattern, and a partial pattern may be interchangeably interpreted.

The UE may determine/judge a switching pattern for a UL BWP, based on an RRC information element related to a BWP configuration (for example, BWP-Config). For example, the switching pattern for a UL BWP may be included in the RRC information element related to the BWP configuration (for example, BWP-Config).

For example, periodicity and a (time) offset of a UL resource in XDD may be included in the RRC information element related to the BWP configuration (for example, BWP-Config). The periodicity and offset may be expressed in units of specific time (for example, slot, symbol) or may be indicated by any time.

The UE may determine/judge a switching pattern for a UL BWP, based on an RRC information element related to a BWP configuration in XDD. The RRC control element may be a parameter defined in Rel. 17 or later versions or a parameter other than an existing RRC information element related to a TDD configuration (for example, TDD-UL-DL-Config) and an RRC information element related to a BWP configuration (for example, BWP-Config).

Embodiment 2-2-2

A restriction related to the configuration of a switching pattern for a UL BWP may be defined.

A restriction related to the location of an XDD UL resource in the time domain may be defined. For example, a UL resource in XDD may be restricted so as to be configured at least one of after a normal UL resource or before a normal DL resource in terms of time.

For example, a UL resource in XDD may be restricted so as to be configured only in specific resources. The specific resources may be, for example, resources (for example, slots) to which UL and DL are allocated. The specific resources may be, for example, resources (for example, slots) in which a part other than a UL resource in XDD is a normal UL resource (symbols). The specific resources may be, for example, slots not including an SS/PBCH block.

For example, a UL resource in XDD may be restricted so as to be configured at least one of before a normal UL resource or after a normal DL resource in terms of time.

A DL/UL BWP configuration and BWP switching in XDD are similar to the aspect described in Embodiment 1-2-2.

Embodiment 2-3

In Embodiment 2-3, dynamic UL BWP adaptation between a pure UL resource and a UL resource in XDD may be supported.

The UE may determine/judge to perform the dynamic UL BWP adaptation between a pure UL resource and a UL resource in XDD, based on at least one of DCI, a MAC CE, and a specific condition.

Dynamic adaptation of a UL BWP for XDD may mean switching between a normal UL BWP and a UL BWP in XDD.

The dynamic adaptation of a UL BWP for XDD may mean activation/deactivation of a UL BWP in XDD related to a normal UL BWP.

The UE may receive an indication related to UL BWP adaptation and thereafter apply UL BWP adaptation only in a specific period (Embodiment 2-3-1). The specific period may be one or more slots/symbols. The specific period may be indicated by an offset from a slot/symbol in which the indication is transmitted/received. The specific period may be indicated by a specific number of slots/symbols. The specific period/offset may be defined in advance in a specification, may be configured/notified by higher layer signaling, or may be dynamically indicated by DCI.

The UE may receive an indication related to UL BWP adaptation and thereafter apply UL BWP adaptation until receiving the next indication related to UL BWP adaptation (Embodiment 2-3-2). In other words, the UE may receive an indication related to UL BWP adaptation and thereafter apply UL BWP adaptation until receiving an indication indicating cancellation/override of the indication.

The UE may receive an indication related to UL BWP adaptation and thereafter apply UL BWP adaptation until a specific condition is satisfied (Embodiment 2-3-3). The specific condition may be expiration of a specific timer, for example.

At least two of the methods described in Embodiments 2-3-1 to 2-3-3 above may be applied in combination.

At least one of switching delay related to BWP adaptation and a mechanism/condition of indication may be the same as or different from at least one of existing switching delay and mechanism/condition of indication (defined in Rel. 15/16). For example, delay required for switching of DL BWP adaptation in XDD may be configured/defined to be shorter (or longer) than an existing delay time.

Embodiment 2-4

UE capability for supporting at least one of UL BWP configuration and adaptation in XDD operation may be defined. The UE capability may be UE capability common to or different from UE capability for supporting at least one of DL BWP configuration and adaptation in XDD operation.

The UE capability may be different from UE capability related to operation related to a plurality of BWPs. The UE capability may be capability supported by a UE supporting UE capability related to operation related to a plurality of BWPs.

The UE capability may be reported to a network for each UE/each band/each feature set (FS) (each band in units of a plurality of bands)/each cell in units of feature set (FS) (each CC for each band in units of a combination of a plurality of bands).

When a UL BWP in XDD is configured/activated for a specific period (for example, a slot/symbol), the UE may interpret frequency domain resource assignment (FDRA) in the specific period similarly to a corresponding normal UL BWP. Specifically, (numbering/ordering of) PRB indices assigned to a normal UL BWP and a UL BWP in XDD may be the same. In this case, the UE may assume that no UL channel/signal is scheduled in any non-available PRB by FDRA. Alternatively, the UE need not perform, even when a UL channel/signal is scheduled in a non-available PRB by FDRA, transmission processing on the UL channel/signal in the scheduled part.

When a UL BWP in XDD is configured/activated for a specific period, the UE may interpret FDRA in the specific period differently from a corresponding normal UL BWP. Specifically, (numbering/ordering of) PRB indices assigned to a normal UL BWP and a UL BWP in XDD may be different from each other. Regarding PRBs in a UL BWP in XDD, numbering/ordering of PRB indices need not be performed for a non-available PRB compared with a corresponding normal UL BWP. In this case, the PRBs of the UL BWP in XDD may be referred to as virtually contiguous PRBs.

Note that, although a description has been given by limiting to PRBs above, resources are not limited to these.

When at least part of UL channels/signals is configured/scheduled outside the configured/activated UL BWP in XDD, the UE may judge not to transmit the UL channels/signals. The UE need not assume (expect) that at least part of UL channels/signals is configured/scheduled outside the configured/activated UL BWP in XDD.

When at least part of UL channels/signals is configured/scheduled outside the configured/activated UL BWP in XDD, the UE may judge not to transmit the at least part of UL channels/signals configured/scheduled outside the UL BWP. In this case, the UE may perform puncturing/rate matching on the UL channels/signals. The puncturing/rate matching may be performed based on a specification or may be configured/notified by higher layer signaling (RRC signaling).

According to the second embodiment above, it is possible to appropriately perform configuration of a UL BWP in XDD operation.

Third Embodiment

Analysis

To achieve XDD operation, an existing configuration/indication related to a slot format may be used to indicate a slot in a different link direction (DL ('D')/UL ('U')/flexible ('F')) for each UE.

Figures 6A, 6B:
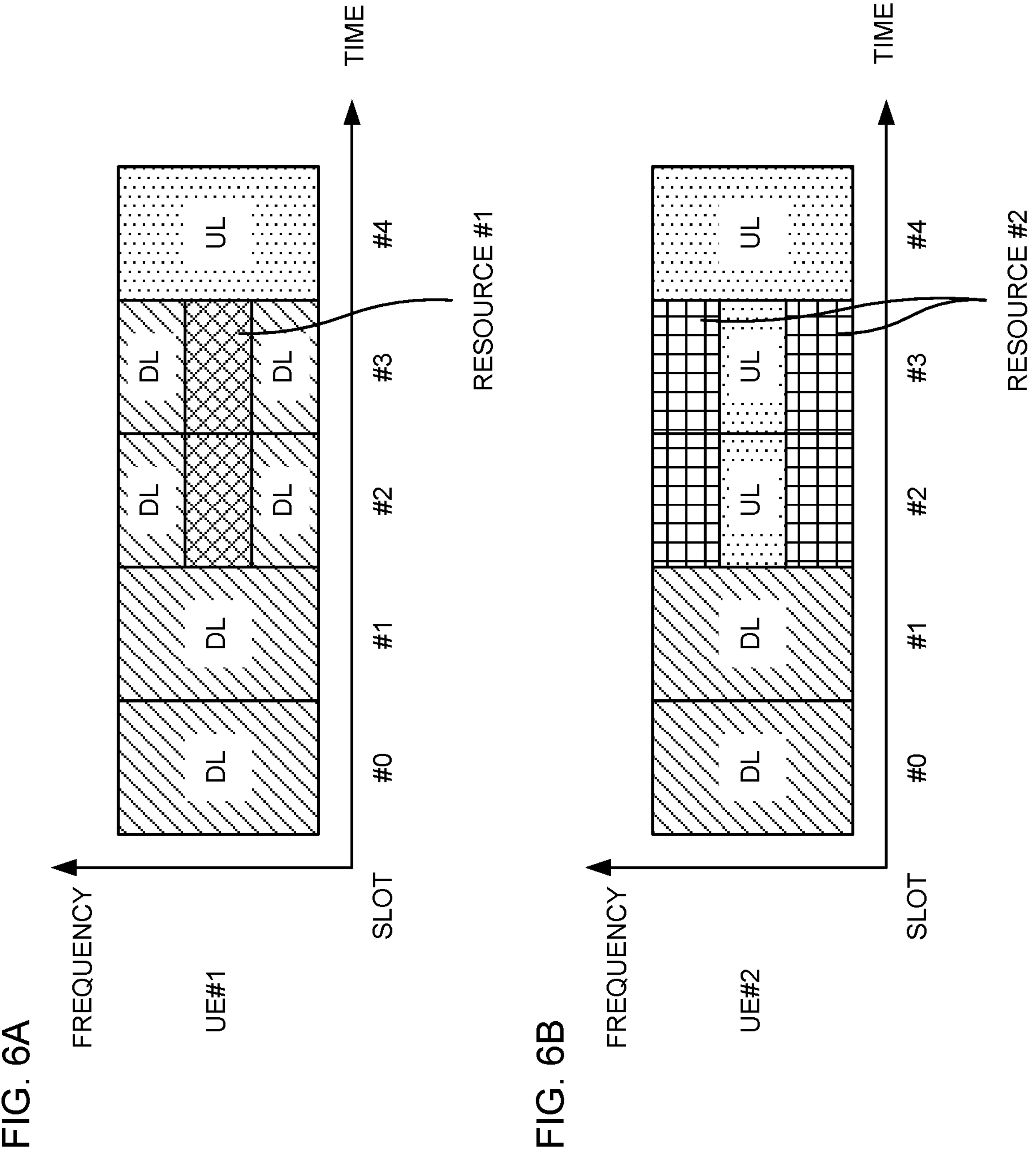
FIGS. 6A and 6B are diagrams to show examples of a slot format.

In the example in FIGS. 6A and 6B, first, link directions 'DDFFU' are configured for slots #0 to #4 of each of UE #1 and #2 by RRC.

Thereafter, in the example in FIG. 6A, DCI for UE #1 indicates two 'F' in slots #2 and #3 as two 'D.' Consequently, UE #1 can receive DL in slots #2 and #3.

To achieve XDD operation in slots #2 and #3, it is conceivable that a base station schedules UE #1 without PDSCH reception in resource #1, which corresponds to part of slots #2 and #3. If there is no explicit indication of unavailability of resource #1 and periodic/semi-persistent SSB/CSI-RS may be present in resource #1, a problem may occur in measurement of the SSB/CSI-RS.

In the example in FIG. 6B, DCI for UE #2 indicates two 'F' in slots #2 and #3 as two 'U.' Consequently, UE #2 can transmit UL in slots #2 and #3.

To achieve XDD operation in slots #2 and #3, it is conceivable that a base station schedules UE #2 without PUSCH transmission in resource #2, which corresponds to part of slots #2 and #3. If there is no explicit indication of unavailability of resource #2 and a normal PUCCH/SRS resource configuration is not limited to resource #1 in resource #2, a problem related to PUSCH/SRS/PRACH transmission may occur.

Different link directions of time resources (subframes/slots/mini-slots/symbols) may be indicated for different UEs.

To enable XDD operation in time resources indicated with 'D' for several UEs, several periodic/semi-persistent RS may be studied.

To enable XDD operation in time resources indicated with 'U' for several UEs, several UL channel/RS configurations may be studied.

In the present disclosure, partial availability, partial available indication, partial non-available indication, a partial available DL frequency resource, a partial available UL frequency resource, a partial non-available DL frequency resource, a partial non-available UL frequency resource, and a combination of a link direction (D/F/U) and partial availability may be interchangeably interpreted.

Embodiment 3-1

Based on an existing link direction (D/F/U) indication, a new type of indication (new indication) for indicating "partial availability" for a time unit may be defined. In present disclosure, a time unit may be a time resource having a certain length, for example, a subframe/slot/mini-slot/symbol. In the present disclosure, indication of partial availability may indicate whether part of frequency resources (resource blocks/resource elements) in component carrier/BWP is available in a certain link direction or may indicate the frequency resource (s).

The new indication may be an RRC IE/MAC CE/DCI.

The new indication may be signaling different from signaling of existing link direction indication. In other words, an element of an RRC IE/MAC CE/DCI of the new indication (for example, indication of partial availability, indication of partial frequency resource (s), or the like) may be distinguished from an element of an RRC IE/MAC CE/DCI of existing link direction indication (for example, indication of D/F/U).

The new indication may be signaling combined with signaling of existing link direction indication. In other words, an RRC IE/MAC CE/DCI indicating a combination of the existing link direction indication and the new indication (for example, indication of partial availability and D/F/U, indication of D/F/U/partial available D/partial available U) may be notified.

The UE may be indicated with any one of "partial available indication" (available partial frequency resource) and indication of 'D' (DL time unit) (indication of a partial frequency resource available for DL, indication of a partial available DL frequency resource) and "partial non-available indication" (non-available partial frequency resource) and indication of 'D' (DL time unit) (indication of a partial frequency resource non-available for DL, indication of a partial non-available DL frequency resource).

The UE may be indicated with any one of "partial available indication" (available partial frequency resource) and indication of 'U' (UL time unit) (indication of a partial frequency resource available for UL, indication of a partial available UL frequency resource) and "partial non-available indication" (non-available partial frequency resource) and indication of 'U' (UL time unit) (indication of a partial frequency resource non-available for UL, indication of a partial non-available UL frequency resource).

The UE may be indicated with at least one of "partial available indication" (available partial frequency resource) and indication of 'D' (DL time unit) (indication of a partial available DL frequency resource) and "partial available indication" (available partial frequency resource) and indication of 'U' (UL time unit) (indication of a partial available UL frequency resource). The UE may identify, based on indication of a partial available DL frequency resource in a certain time unit, a partial non-available DL frequency resource(s) in the time unit (partial frequency resource(s) other than the partial available DL frequency resource in the time unit). The UE may identify, based on indication of a partial available UL frequency resource in a certain time unit, a partial non-available DL frequency resource(s) in the time unit (partial frequency resource(s) other than the partial available UL frequency resource in the time unit).

The UE may be indicated with at least one of "partial non-available indication" (non-available partial frequency resource) and indication of 'D' (DL time unit) (indication of a partial non-available DL frequency resource) and "partial non-available indication" (non-available partial frequency resource) and indication of 'U' (UL time unit) (indication of a partial non-available DL frequency resource). The UE may identify, based on indication of a partial non-available DL frequency resource in a certain time unit, a partial available DL frequency resource(s) in the time unit (partial frequency resource(s) other than the partial non-available DL frequency resource in the time unit). The UE may identify, based on indication of a partial non-available UL frequency resource in a certain time unit, a partial available UL frequency resource(s) in the time unit (partial frequency resource(s) other than the partial non-available UL frequency resource in the time unit).

When a time unit is indicated with "partial available indication" and 'D' (when indicated with a partial available DL frequency resource), the UE may assume to receive a DL channel/RS in the partial available DL frequency resource in the time unit but need not assume to receive a DL channel/RS in a partial non-available DL frequency resource in the time unit. When a time unit is indicated with "partial non-available indication" and 'D' (when indicated with a partial non-available DL frequency resource), the UE may assume to receive a DL channel/RS in the partial available DL frequency resource in the time unit but need not assume to receive a DL channel/RS in a partial non-available DL frequency resource in the time unit.

When a time unit is indicated with "partial non-available indication" and 'U' (when indicated with a partial non-available UL frequency resource), the UE may assume to receive a DL channel/RS in the partial non-available UL frequency resource in the time unit but need not assume to receive a DL channel/RS in a partial available UL frequency resource in the time unit.

The partial available DL frequency resource (P_AD) can be configured/indicated by an RRC IE/MAC CE. For example, the configuration/indication of the partial available DL frequency resource may disable some frequency resources (partial non-available DL frequency resources (P_ND)) (FIG. 7A) or combine two sets of frequency resources (FIG. 7B).

Figures 7A, 7B, 7C, 7D:
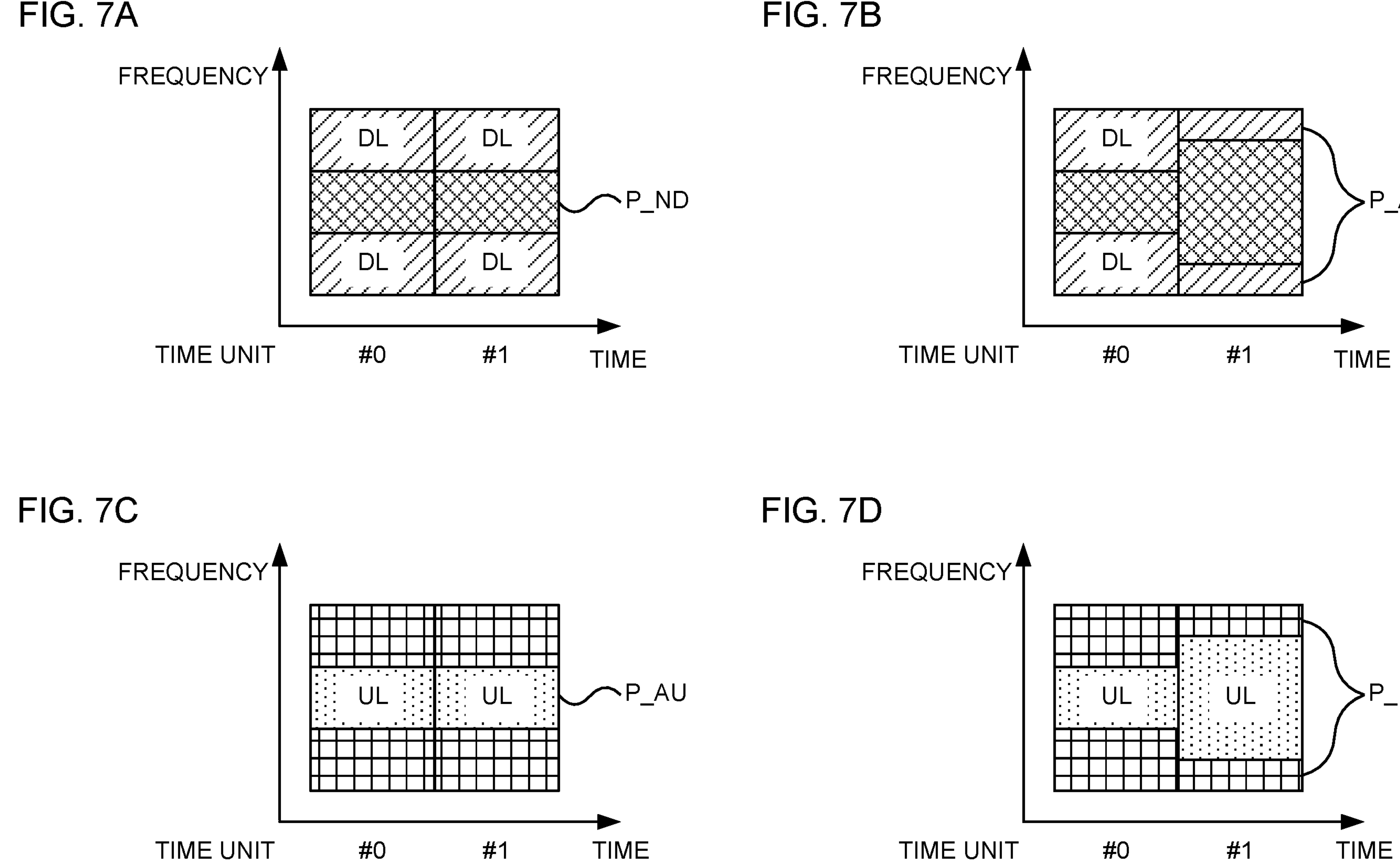
FIGS. 7A to 7D are diagrams to show examples of partial availability according to a third embodiment.

A common partial available DL frequency resource may be configured/indicated for a plurality of time units (for example, time units #0 and #1) (FIG. 7A). Different partial available DL frequency resources may be configured/indicated for a plurality of time units (for example, time units #0 and #1) (FIG. 7B).

When a time unit is indicated with "partial available indication" and 'U' (when indicated with a partial available UL frequency resource), the UE may assume to transmit a UL channel/RS in the partial available UL frequency resource in the time unit but need not assume to transmit a UL channel/RS in a partial non-available UL frequency resource in the time unit. When a time unit is indicated with "partial non-available indication" and 'U' (when indicated with a partial non-available UL frequency resource), the UE may assume to transmit a UL channel/RS in the partial available UL frequency resource in the time unit but need not assume to transmit a UL channel/RS in a partial non-available UL frequency resource in the time unit.

When a time unit is indicated with "partial non-available indication" and 'D' (when indicated with a partial non-available DL frequency resource), the UE may assume to transmit a UL channel/RS in the partial non-available DL frequency resource in the time unit but need not assume to transmit a UL channel/RS in a partial available DL frequency resource in the time unit.

The partial available UL frequency resource (P_AU) can be configured/indicated by an RRC IE/MAC CE. For example, the configuration/indication of the partial available UL frequency resource may disable some frequency resources (partial non-available UL frequency resources (P_NU)) (FIG. 7C) or combine two sets of frequency resources (FIG. 7D).

A common partial available UL frequency resource may be configured/indicated for a plurality of time units (for example, time units #0 and #1) (FIG. 7C). Different partial available UL frequency resources may be configured/indicated for a plurality of time units (for example, time units #0 and #1) (FIG. 7D).

According to this embodiment, it is possible to configure/indicate a link direction for each time resource and also flexibly configure/indicate a partial available or non-available frequency resource.

Embodiment 3-2

Here, a description will be given of UE operation in a partial available DL time unit. The partial available DL time unit may be "partial available indication" and 'D' (partial available DL frequency resource, P_AD), or "partial non-available indication" and 'U' (partial non-available UL frequency resource, P_UL).

PDSCH Reception

The UE may assume that PDSCH reception is scheduled only in a partial available DL frequency resource (or a partial non-available UL frequency resource) in a partial available DL time unit. The UE may perform rate matching around a partial non-available DL frequency resource (or a partial available UL frequency resource) in a partial available DL time unit.

The UE may follow at least one of alternatives 1 to 3 for the PDSCH reception in the partial available DL time unit.

Alternative 1

A frequency resource configuration, mapping of frequency domain resource assignment (frequency domain resource assignment (FDRA) indication in DCI) to a normal DL time unit (time unit not indicated with partial available indication and indicated with 'D'), and a partial available DL time unit are in common (match). The UE need not assume that FDRA indication arranges a PDSCH resource overlapping the partial non-available DL frequency resource (or a partial available UL frequency resource) in the partial available DL time unit. A case where a FDRA field arranges a PDSCH resource overlapping the partial non-available DL frequency resource in the partial available DL time unit may be an error case.

Alternative 2

A frequency resource configuration, mapping of frequency domain resource assignment (FDRA indication in DCI) to a normal DL time unit (time unit not indicated with partial available indication and indicated with 'D'), and a partial available DL time unit are in common (match). The UE may perform rate matching around a partial non-available DL frequency resource (or a partial available UL frequency resource) in a partial available DL time unit. When the FDRA indication includes the partial non-available DL frequency resource in the partial available DL time unit, the UE may perform rate matching around the partial non-available DL frequency resource.

Alternative 3

A frequency resource configuration and mapping of frequency domain resource assignment (FDRA indication in DCI) to a partial available DL time unit are configured separately by RRC IEs. The UE may interpret the FDRA in the partial available DL frequency resource in the partial available DL time unit, based on a new configuration.

The UE may perform similar handling to that for a PDSCH, on a DMRS and a phase tracking reference signal (PTRS).

PDCCH Reception

The UE does not monitor a PDCCH (candidate) in a partial non-available DL frequency resource (or a partial available UL frequency resource) in a partial available DL time unit. The UE may follow option 1 or 2 below.

Option 1

A CORESET and search space (SS) configuration is common to all the DL time units.

Option 2

The CORESET and SS configuration may be configured separately for partial available DL time units by RRC IEs.

SSB Measurement

The UE does not monitor an SSB in a partial non-available DL frequency resource (or a partial available UL frequency resource) in a partial available DL time unit. The UE may follow option 1 or 2 below. Alternatively, the UE need not assume that monitoring of an SSB is configured in a time resource configured with a partial available DL time unit.

Option 1

If an SSB can be transmitted according to SSB periodicity in the partial non-available DL frequency resource in the partial available DL time unit, the UE ignores (does not perform) SSB measurement in the partial non-available DL frequency resource.

Option 2

If an SSB can be transmitted in a certain time unit according to SSB periodicity, the UE does not assume that the time unit is indicated with a partial available DL frequency resource.

CSI-RS Measurement

The UE does not monitor a CSI-RS in a partial non-available DL frequency resource (or a partial available UL frequency resource) in a partial available DL time unit. The UE may follow option 1 or 2 below.

Option 1

If a CSI-RS can be transmitted according to periodic/semi-persistent CSI-RS periodicity in the partial non-available DL frequency resource in the partial available DL time unit, the UE ignores (does not perform) CSI-RS measurement in the partial non-available DL frequency resource.

Option 2

The UE does not assume that an aperiodic CSI-RS is transmitted in a partial non-available DL frequency resource in a partial available DL time unit (aperiodic CSI-RS transmitted in the partial non-available DL frequency resource in the partial available DL time unit is scheduled (triggered) by DCI).

DL-PRS Measurement

The UE does not monitor a DL-positioning reference signal (PRS) in a partial non-available DL frequency resource (or a partial available UL frequency resource) in a partial available DL time unit. The UE may follow option 1 or 2 below.

Option 1

If a DL-PRS can be transmitted according to periodicity in the partial non-available DL frequency resource in the partial available DL time unit, the UE ignores (does not perform) DL-PRS measurement in the partial non-available DL frequency resource.

Option 2

If a DL-PRS can be transmitted in a certain unit according to periodicity, the UE does not assume that the time unit is indicated with a partial available DL frequency resource.

According to this embodiment, the UE can appropriately control, for each time resource, reception in the time resource indicated with DL and partial availability.

Embodiment 3-3

Here, a description will be given of UE operation in a partial available UL time unit. The partial available UL time unit may be "partial available indication" and 'U' (partial available UL frequency resource, P_AU), or "partial non-available indication" and 'D' (partial non-available DL frequency resource, P_ND).

PUCCH Configuration

The UE may follow at least one of options 1 and 2 below for a PUCCH configuration for a partial available UL time unit.

Option 1

For a partial available UL time unit, another PUCCH configuration can be configured. The PUCCH configuration for the partial available UL time unit may be configured separately from a PUCCH configuration for a normal UL time unit (time unit not indicated with partial available indication and indicated with 'U').

Option 2

A single PUCCH configuration including several PUCCH resources for normal UL time unit and several PUCCH resources for partial available UL time unit is configured. The UE may select a PUCCH resource corresponding to a time resource.

Depending on the use of PUCCH, the UE may follow alternative 1 or 2 below.

Alternative 1

For a partial available UL time unit, the use of PUCCH (type of UCI, HARQ-ACK/CSI/SR, and the like) is not limited particularly.

Alternative 2

For a partial available UL time unit, the use of PUCCH is limited only to HARQ-ACK feedback (HARQ-ACK with SR or HARQ-ACK without SR).

A configuration related to transmission power control (TPC) for a partial available UL time unit may be different from a configuration related to TPC for a normal UL time unit.

The UE may perform similar handling to that for a PUCCH, on a DMRS.

PUSCH Configuration

The UE may follow at least one of options 1 and 2 below for a PUSCH configuration for a partial available UL time unit.

Option 1

For a partial available UL time unit, another PUSCH configuration (PUSCH configuration other than a PUSCH configuration for a normal UL time unit) is configured. In this case, a scheduled PUSCH may be in a partial available UL frequency resource (may be limited to a partial available UL frequency resource).

Option 2

Another PUSCH configuration for a partial available UL time unit (PUSCH configuration other than a PUSCH configuration for a normal UL time unit) is not configured. In this case, the UE need not assume that PUSCH transmission in a partial non-available UL frequency resource is scheduled.

A configuration related to TPC for a partial available UL time unit may be different from a configuration related to TPC for a normal UL time unit. The UE may perform similar handling to that for a PUSCH, on a DMRS and a PTRS.

PRACH Configuration

The UE may follow at least one of options 1 and 2 below for a PRACH configuration for a partial available UL time unit.

Option 1

For a partial available UL time unit, another PRACH configuration (PRACH configuration other than a PRACH configuration for a normal UL time unit) is configured. In this case, PRACH resource selection and transmission may be in a partial available UL frequency resource (may be limited to a partial available UL frequency resource).

Option 2

Another PRACH configuration for a partial available UL time unit (PRACH configuration other than a PRACH configuration for a normal UL time unit) is not configured. In this case, the UE may follow alternative 1 or 2 below.

Alternative 1

The UE need not select a PRACH resource in a partial non-available UL frequency resource and need not be ordered with a PRACH resource in a partial non-available UL frequency resource by a PDCCH.

Alternative 2

The UE may ignore (need not perform) PRACH transmission overlapping a partial non-available UL frequency resource. For example, when PRACH transmission ordered by a PDCCH overlaps a partial non-available UL frequency resource, the UE may ignore (need not perform) the PRACH transmission.

SRS Configuration

The UE may follow at least one of options 1 and 2 below for an SRS configuration for a partial available UL time unit.

Option 1

For a partial available UL time unit, another SRS configuration (SRS configuration other than an SRS configuration for a normal UL time unit) is configured. In this case, SRS resource selection and transmission may be in a partial available UL frequency resource (may be limited to a partial available UL frequency resource).

Option 2

Another SRS configuration for a partial available UL time unit (SRS configuration other than an SRS configuration for a normal UL time unit) is not configured. In this case, the UE may follow alternative 1 or 2 below.

Alternative 1

The UE need not select an SRS resource in a partial non-available UL frequency resource and need not be triggered with an SRS resource in a partial non-available UL frequency resource by DCI.

Alternative 2

The UE does not assume that a partial available UL frequency resource/partial non-available UL frequency resource is configured for a time resource with a periodic/semi-persistent-SRS.

According to this embodiment, the UE can appropriately control, for each time resource, transmission in the time resource indicated with UL and partial availability.

Other Embodiments

In each of the above embodiments, a description has been mainly given of a configuration/indication/operation for RRC-connected (RRC_CONNECTED) UE. However, some configurations/indications/operations in the embodiments may be applied to an RRC-idle (RRC-IDLE) UE/RRC-inactive (RRC_INACTIVE) UE.

For example, for the UE to handle "partial availability" in SSB monitoring, RACH execution, and the like, a new type of indication of "partial availability" may be broadcast in system information (for example, an SIB).

For example, another RACH configuration for a time unit indicated with "partial availability" (RACH configuration other than a RACH configuration for a normal time unit) may be broadcast in system information (for example, an SIB). When the UE executes a RACH in the time unit indicated with "partial availability," the UE can follow the broadcast configuration.

The broadcast type/configuration may be used by the UE having new UE capability.

In the present disclosure, a guard band may be configured/indicated between a DL frequency resource and a UL frequency resource in the same time resource. The guard band may be non-available for both DL and UL.

UE Capability/Higher Layer Parameter

A higher layer parameter (RRC information element)/UE capability for at least one function (characteristics, feature) in each of the embodiments may be defined. The UE capability may indicate whether to support this function.

The UE for which the higher layer parameter corresponding to the function may perform the function. It may be defined that a "UE for which no higher layer parameter corresponding to the function is configured does not perform the function (for example, employs operation of Rel. 15/16)."

A UE which has reported UE capability indicating that the function is supported may perform the function. It may be defined that a "UE which has not reported UE capability indicating that the function is supported does not perform the function (for example, employs operation of Rel. 15/16)."

When the UE has reported UE capability indicating that the function is supported and the higher layer parameter corresponding to the function is configured, the UE may perform the function. It may be defined that "when a UE does not report UE capability indicating that the function is supported or when a higher layer parameter corresponding to the function is not configured, the UE does not perform the function (for example, employs operation of Rel. 15/16)."

The UE capability may indicate whether to support a new type of configuration/indication of "partial availability" by an RRC IE.

The UE capability may indicate whether to support at least one of "partial availability indication" and 'D' and "partial availability indication" and 'U.'

The UE capability may indicate whether to support update of "partial availability" by a MAC CE/DCI.

The UE capability may indicate whether to support a configuration of a specific DL/UL channel/RS for a time unit having "partial availability" (configuration other than a configuration for a normal time unit). The configuration for a time unit having "partial availability" may be common to a plurality of specific channels/RSs. The specific channels/RSs may each be at least one of the following.

PDCCH
PDSCH
PUCCH
PUSCH
PRACH
SRS

The UE capability may be defined as the number of channels/RSs that can be transmitted/received simultaneously. The UE capability may be defined as the number of channels/RSs that can be transmitted/received simultaneously within one operating band.

According to the UE capabilities/higher layer parameters above, the UE can, while maintaining compatibility with existing specifications, implement the above-described functions.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
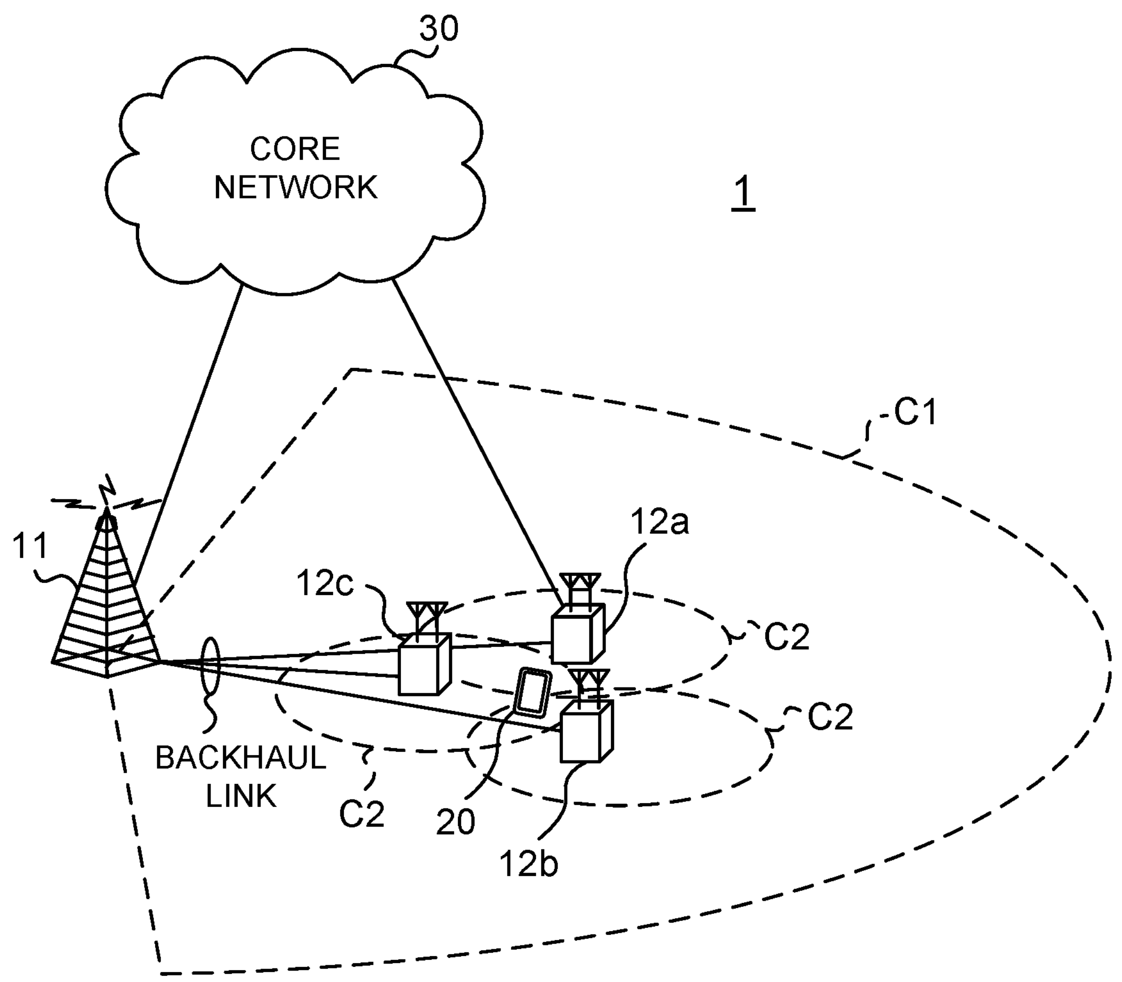
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 9:
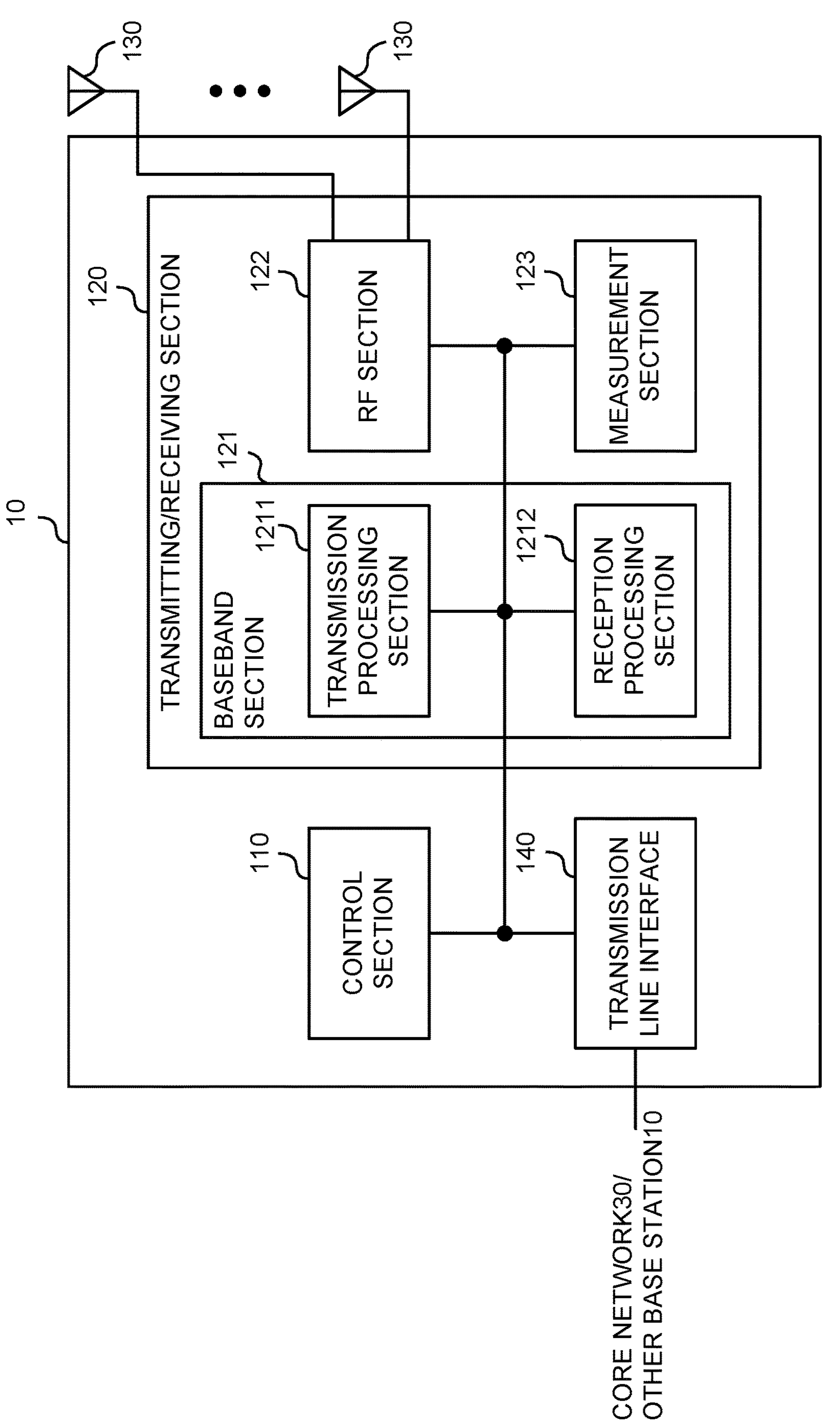
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band. The control section 110 may control at least one of configuration, application, activation, and switching of a DL/UL BWP by using the RRC information element.

The transmitting/receiving section 120 may transmit indication of a link direction (for example, D/U/F) for a first time resource (for example, a time unit) and availability of part of a frequency resource in the first time resource (for example, partial availability, partial available, partial non-available). The control section 110 may control uplink reception or downlink transmission in the frequency resource in the first time resource, based on the indication.

User Terminal

Figure 10:
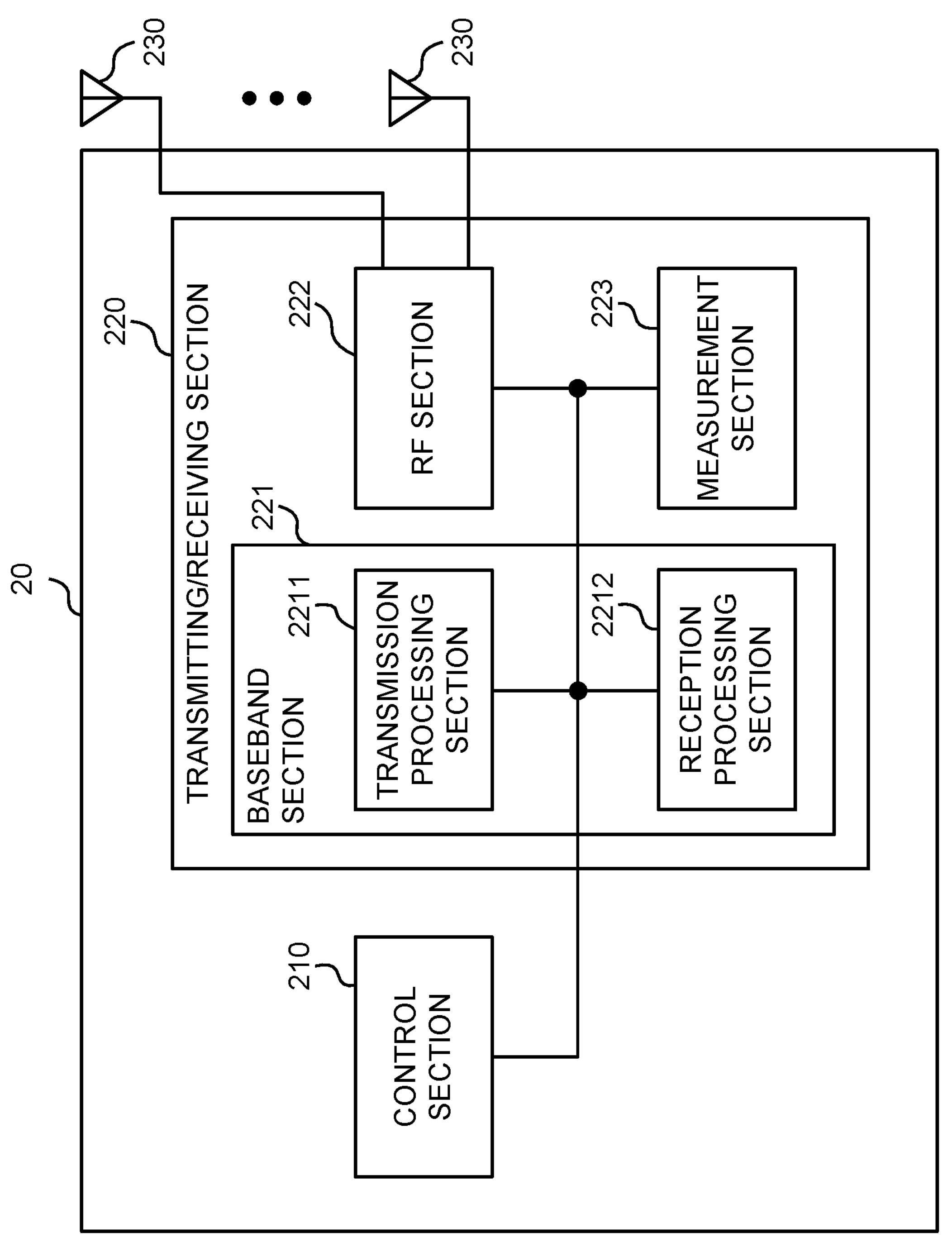
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band. The control section 210 may control at least one of configuration, application, activation, and switching of a DL/UL BWP, based on the RRC information element.

The DL/UL BWP may be allowed to be configured of discontinuous physical resource blocks (PRBs).

The RRC information element may be an RRC information element for TDD configuration or an RRC information element for BWP configuration.

The transmitting/receiving section 220 may further receive downlink control information (DCI) and a Medium Access Control (MAC) control element. The control section 210 may control timing and a period of application of the DL/UL BWP, based on the RRC information element and at least one of the DCI and the MAC CE.

The transmitting/receiving section 220 may receive indication of a link direction (for example, D/U/F) for a first time resource (for example, a time unit) and availability of part of a frequency resource in the first time resource (for example, partial availability, partial available, partial non-available). The control section 210 may control uplink transmission or downlink reception in the frequency resource in the first time resource, based on the indication.

The availability may indicate any one of the frequency resource being available for downlink, the frequency resource being non-available for downlink, the frequency resource being available for uplink, and the frequency resource being non-available for uplink.

The transmitting/receiving section 220 may receive a first configuration of a first kind of channel or signal for the first time resource and a second configuration of the first kind of channel or reference signal for a second time resource not indicated with the availability. The control section 210 may control transmission or reception of the first kind of channel or reference signal in the first time resource, based on the first configuration, and control transmission or reception of the first kind of channel or reference signal in the second time resource, based on the second configuration.

Transmission or reception of a second kind of channel or a signal may be performed in a time resource not indicated with the availability and need not be performed in the first resource.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
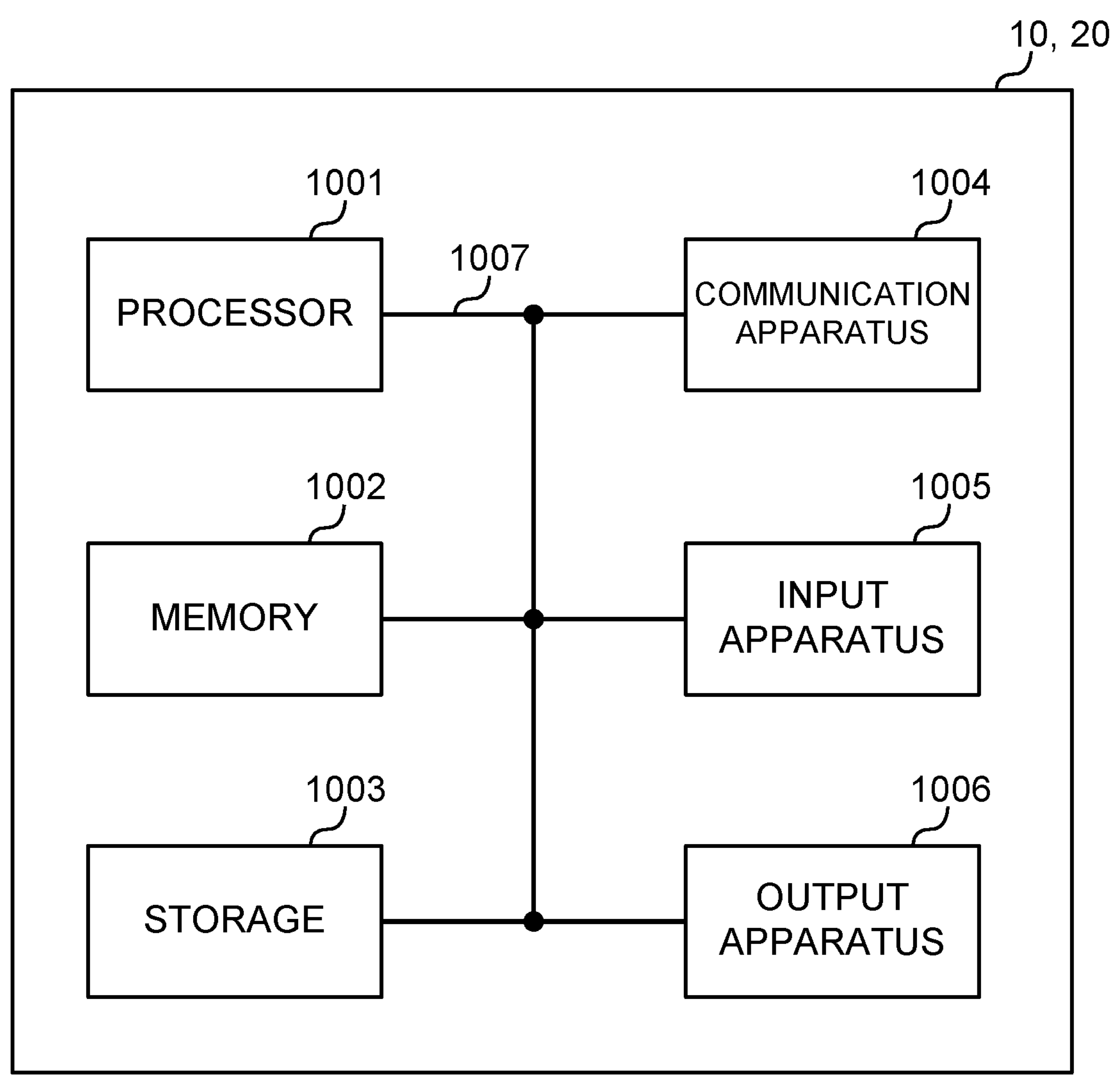
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CES).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," "serving cell," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band, wherein the BWP configuration configures a BWP that includes a partial available UL frequency resource; and a processor that controls at least one of configuration, application, activation, and switching of the partial available UL frequency resource of the BWP, based on the RRC information element.

2. The terminal according to claim 1, wherein the UL BWP is allowed to be configured of discontinuous physical resource blocks (PRBs).

3. The terminal according to claim 1, wherein the RRC information element is an RRC information element for TDD configuration or an RRC information element for BWP configuration.

4. The terminal according to claim 1, wherein the receiver further receives downlink control information (DCI) and a Medium Access Control (MAC) control element, and the processor controls timing and a period of application of the UL BWP, based on the RRC information element and at least one of the DCI and the MAC CE.

5. A radio communication method for a terminal, the radio communication method comprising:

receiving a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band, wherein the BWP configuration configures a BWP that includes a partial available UL frequency resource; and controlling at least one of configuration, application, activation, and switching of the partial available UL frequency resource of the BWP, based on the RRC information element.

6. A base station comprising:

a transmitter that transmits a Radio Resource Control (RRC) information element related to a bandwidth part (BWP) configuration in a duplex method of performing frequency division multiplexing on an uplink (UL) resource and a downlink (DL) resource in one component carrier in a time division duplex (TDD) band, wherein the BWP configuration configures a BWP that includes a partial available UL frequency resource; and a processor that controls at least one of configuration, application, activation, and switching of the partial available UL frequency resource of the BWP by using the RRC information element.

* * * * *